US010056958B2

(12) United States Patent
Rajagopal et al.

(10) Patent No.: US 10,056,958 B2
(45) Date of Patent: Aug. 21, 2018

(54) METHOD AND APPARATUS FOR MULTIUSER BEAMFORMING IN MMWAVE WIRELESS LAN SYSTEMS

(71) Applicant: Samsung Electronics Co., Ltd., Suwon-si, Gyeonggi-do (KR)

(72) Inventors: Sridhar Rajagopal, Plano, TX (US); Rakesh Taori, McKinney, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 5 days.

(21) Appl. No.: 14/599,357

(22) Filed: Jan. 16, 2015

(65) Prior Publication Data

US 2016/0119043 A1 Apr. 28, 2016

Related U.S. Application Data

(60) Provisional application No. 62/069,141, filed on Oct. 27, 2014, provisional application No. 62/069,135, filed on Oct. 27, 2014.

(51) Int. Cl.
*H04W 4/00* (2018.01)
*H04B 7/06* (2006.01)
*H04B 7/08* (2006.01)
*H04B 7/0452* (2017.01)
*H04B 7/0408* (2017.01)

(52) U.S. Cl.
CPC ........... *H04B 7/063* (2013.01); *H04B 7/0452* (2013.01); *H04B 7/0617* (2013.01); *H04B 7/0695* (2013.01); *H04B 7/086* (2013.01); *H04B 7/088* (2013.01); *H04B 7/0408* (2013.01)

(58) Field of Classification Search
None
See application file for complete search history.

(56) References Cited

U.S. PATENT DOCUMENTS

2008/0062923 A1* 3/2008 Ponnuswamy ..... H04W 72/005
370/331
2009/0318091 A1* 12/2009 Wang .................. H04B 7/0617
455/67.14
(Continued)

FOREIGN PATENT DOCUMENTS

KR 20110102493 A 9/2011

OTHER PUBLICATIONS

International Search Report dated Mar. 8, 2016 in connection with International Patent Application No. PCT/KR2015/010812.
(Continued)

*Primary Examiner* — Rebecca E Song

(57) ABSTRACT

A method of providing multiple station beam refinement in a mmWave wireless network comprising an access point (AP) and a plurality of stations (STAs) is provided. The method includes providing an AP configured to selectively transmit wireless signals to a plurality of directional sectors and to selectively receive wireless signals from the plurality of directional sectors. The method further includes operating the AP to at least one of provide simultaneous transmit beam refinement for the plurality of STAs, provide simultaneous receive beam refinement for the plurality of STAs, receive simultaneous transmit beam refinement from the plurality of STAs, and receive simultaneous receive beam refinement from the plurality of STAs.

20 Claims, 28 Drawing Sheets

(56) References Cited

U.S. PATENT DOCUMENTS

| | | | |
|---|---|---|---|
| 2010/0214169 A1 | 8/2010 | Kafle | |
| 2010/0265925 A1* | 10/2010 | Liu | H04B 7/0617 370/336 |
| 2011/0064033 A1* | 3/2011 | Gong | H04B 7/0617 370/329 |
| 2011/0080898 A1 | 4/2011 | Cordeiro et al. | |
| 2011/0116487 A1* | 5/2011 | Grandhi | H04W 72/1278 370/338 |
| 2011/0149941 A1* | 6/2011 | Gong | H04B 7/0634 370/343 |
| 2012/0108281 A1 | 5/2012 | Niu et al. | |
| 2013/0059619 A1* | 3/2013 | Kim | H04W 72/046 455/509 |
| 2013/0128837 A1 | 5/2013 | Gong et al. | |
| 2013/0315325 A1 | 11/2013 | Wang et al. | |
| 2014/0051351 A1* | 2/2014 | Jia | H01Q 1/007 455/39 |
| 2014/0161105 A1* | 6/2014 | Cordeiro | H04B 7/0617 370/336 |
| 2015/0146812 A1* | 5/2015 | Chu | H04B 7/0417 375/267 |
| 2015/0208439 A1* | 7/2015 | Cheong | H04B 7/0617 370/329 |
| 2015/0230263 A1* | 8/2015 | Roy | H04W 36/0083 455/452.2 |
| 2015/0244432 A1* | 8/2015 | Wang | H04B 7/0695 375/267 |
| 2015/0289147 A1* | 10/2015 | Lou | H04B 7/0408 370/329 |
| 2015/0382268 A1* | 12/2015 | Hampel | H04W 36/0072 455/436 |
| 2016/0174206 A1* | 6/2016 | Xia | H04B 7/0491 370/329 |

OTHER PUBLICATIONS

Written Opinion of the International Searching Authority dated Mar. 8, 2016 in connection with International Patent Application No. PCT/KR2015/010812.

Communication from a foreign patent office in a counterpart foreign application, European Patent Office, "Supplementary European Search Report," Application No. EP 15853966.8, dated May 23, 2018, 12 pages.

Perahia, Eldad, et al., "Gigabit wireless LANs: an overview of IEEE 802.11ac and 802.11ad," ResearchGate, Jan. 2011, 12 pages, XP055424759.

Rajagopal, Sridhar, et al., "MIMO designs for mmWave wireless LAN systems," 2014 48th Asilomar Conference on Signals, Systems and Computers, 2014, IEEE, Nov. 2, 2014, 5 pages, XP032769373.

* cited by examiner

|  | CBR-Rx<br>WB->SB | FBR<br>SB->NB | TR<br>SB/NB |
|---|---|---|---|
| AP->STA-<br>SameSec. | CBR-<br>Rx:Case 1<br>FIGURES<br>16 and 17 | FBR-<br>Rx:Case 1 | N/A |
| AP->STA-<br>DiffSec. | CBR-<br>Rx:Case 2<br>FIGURES<br>18 and 19 | FBR-<br>Rx:Case 2 | TR-Case 1<br>FIGURES<br>22 and 23 |
| STA->AP | CBR-<br>Rx:Case 3<br>FIGURES<br>20 and 21 | FBR-<br>Rx:Case 3 | TR-Case 2<br>FIGURES<br>24 and 25 |

FIGURE 28

METHOD AND APPARATUS FOR MULTIUSER BEAMFORMING IN MMWAVE WIRELESS LAN SYSTEMS

CROSS-REFERENCE TO RELATED APPLICATION(S) AND CLAIM OF PRIORITY

The present application claims priority to U.S. Provisional Patent Application Ser. No. 62/069,141, filed Oct. 27, 2014, entitled "METHOD AND APPARATUS FOR MULTIUSER BEAMFORMING IN MMWAVE WIRELESS LAN SYSTEMS" and claims priority to U.S. Provisional Patent Application Ser. No. 62/069,135, filed Oct. 27, 2014, entitled "METHOD AND APPARATUS FOR FAST ASSOCIATION IN MMWAVE WIRELESS LAN SYSTEMS. The content of both the above-identified patent documents are incorporated herein by reference.

TECHNICAL FIELD

The present application relates generally to mmWave wireless networks and, more specifically, to beam refinement in mmWave wireless networks.

BACKGROUND

Some beamformed millimeter Wave (mmWave) wireless networks are configured around accommodating a small number of users or station (STAs). In some beamformed mmWave wireless networks, beam refinement for multiple STAs can be a time and power consuming process as a function of an inefficient beam refinement procedure. In some beamformed mmWave wireless networks, the above-described time and power inefficiencies can be made worse as the number of STAs in the network is increased.

SUMMARY

In certain embodiments, a method for providing multiple station beam refinement in a mmWave wireless network that includes an access point (AP) and a plurality of stations (STAs) is provided. The method includes providing an AP configured to selectively transmit wireless signals to a plurality of directional sectors and to selectively receive wireless signals from the plurality of directional sectors. The method further includes operating the AP to at least one of provide simultaneous transmit beam refinement for the plurality of STAs, provide simultaneous receive beam refinement for the plurality of STAs, receive simultaneous transmit beam refinement from the plurality of STAs, and receive simultaneous receive beam refinement from the plurality of STAs.

In certain embodiments, an access point (AP) for a millimeter wave (mmWave) wireless network comprising the access point (AP) and a plurality of stations (STAs) is provided. The AP includes processing circuitry configured to generate a multiple station beamforming procedure (Multi-STA BRP) frame configured to trigger simultaneous beam refinement between the AP and the plurality of STAs.

In certain embodiments, an access point (AP) for a millimeter wave (mmWave) wireless network comprising the access point (AP) and a plurality of stations (STAs) is provided. The AP includes processing circuitry configured to at least one of provide simultaneous transmit beam refinement for the plurality of STAs, provide simultaneous receive beam refinement for the plurality of STAs, receive simultaneous transmit beam refinement from the plurality of STAs, and receive simultaneous receive beam refinement from the plurality of STAs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 28 illustrates a matrix of possible Multi-STA BRP cases according to this disclosure.

DETAILED DESCRIPTION

FIGS. 1 through 28, discussed below, and the various embodiments used to describe the principles of the present disclosure are by way of illustration only and should not be construed in any way to limit the scope of the disclosure. Those skilled in the art will understand that the principles of this disclosure can be implemented in any suitably arranged device or system.

Figure 1:
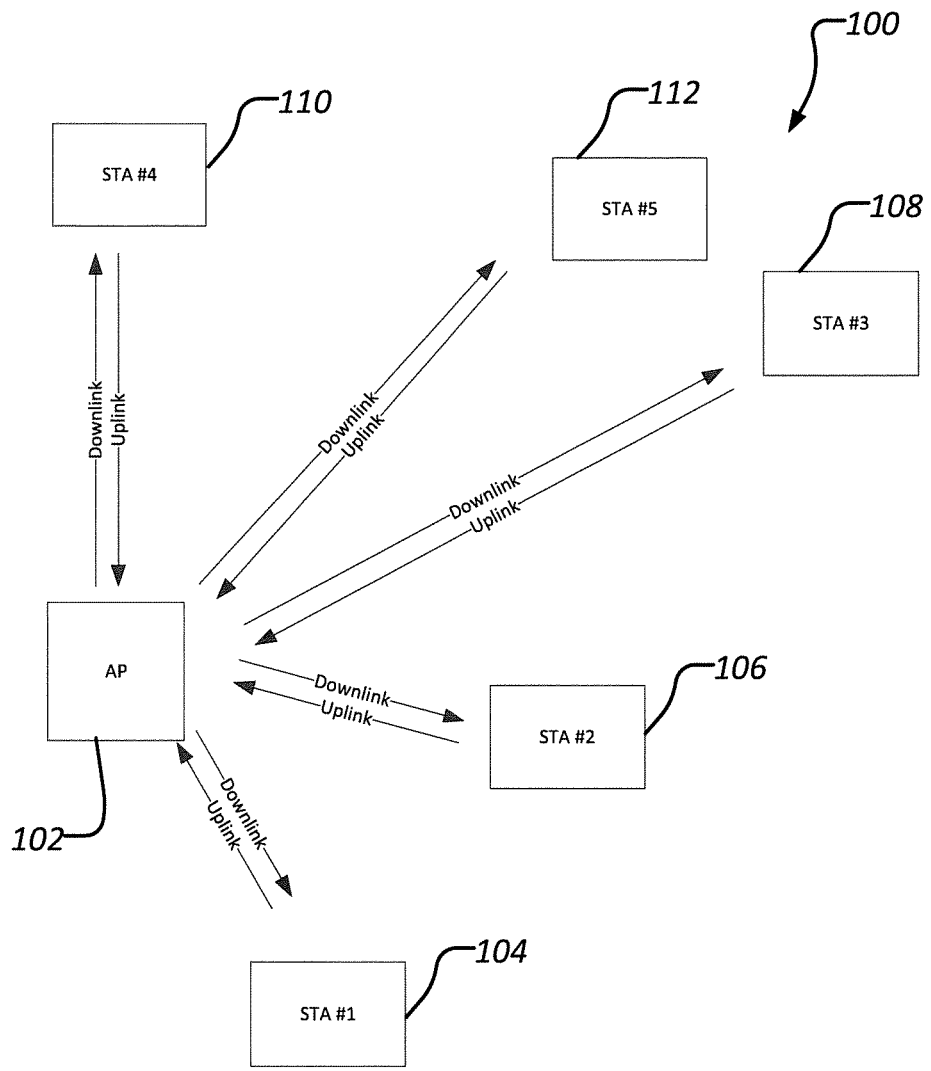
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments could be used without departing from the scope of this disclosure.

The wireless network 100 includes an access point (AP) 102 and a plurality of stations (STAs) configured to wirelessly communicate with the AP 102. In the example illustrated in FIG. 1, the wireless network 100 includes a first station 104, a second station 106, a third station 108, a fourth station 110, and a fifth station 112. However, the wireless network 100 can include more or fewer stations. The wireless network 100 can be configured according to one or more 802.11 based communication standards. Each station transmits uplink signals to the AP 102 and receives downlink signals from the AP 102.

Depending on the network type, other well-known terms may be used instead of AP, such as "eNodeB" or "eNB," or "base station." For the sake of convenience, the term "AP" is used in this patent document to refer to network infrastructure components that provide wireless access to remote terminals. Also, depending on the network type, other well-known terms may be used instead of STA, such as "user equipment" or "UE," "mobile station," "subscriber station," "remote terminal," "wireless terminal," or "user device." For the sake of convenience, the term "STA" is used in this patent document to refer to remote wireless equipment that wirelessly accesses an AP, whether the UE is a mobile device (such as a mobile telephone or smartphone) or is normally considered a stationary device (such as a desktop computer or vending machine).

The AP 102 provides wireless fidelity (WiFi) access, such as 802.11 based communications, to a network, such as the Internet, for the first STA 104, the second STA 106, the third STA 108, the fourth STA 110, and the fifth STA 112. The AP 102 can be located one of: a small business (SB); an enterprise (E); in a WiFi hotspot (HS); in a first residence (R); in a second residence (R); and a mobile device (M) like a cell phone, a wireless laptop, a wireless PDA, or the like. In certain embodiments, one or more of the AP 102 or the STAs 104, 106, 108, 112 and 114 are configured to support beam refinement in mmWave wireless systems.

Figure 2:
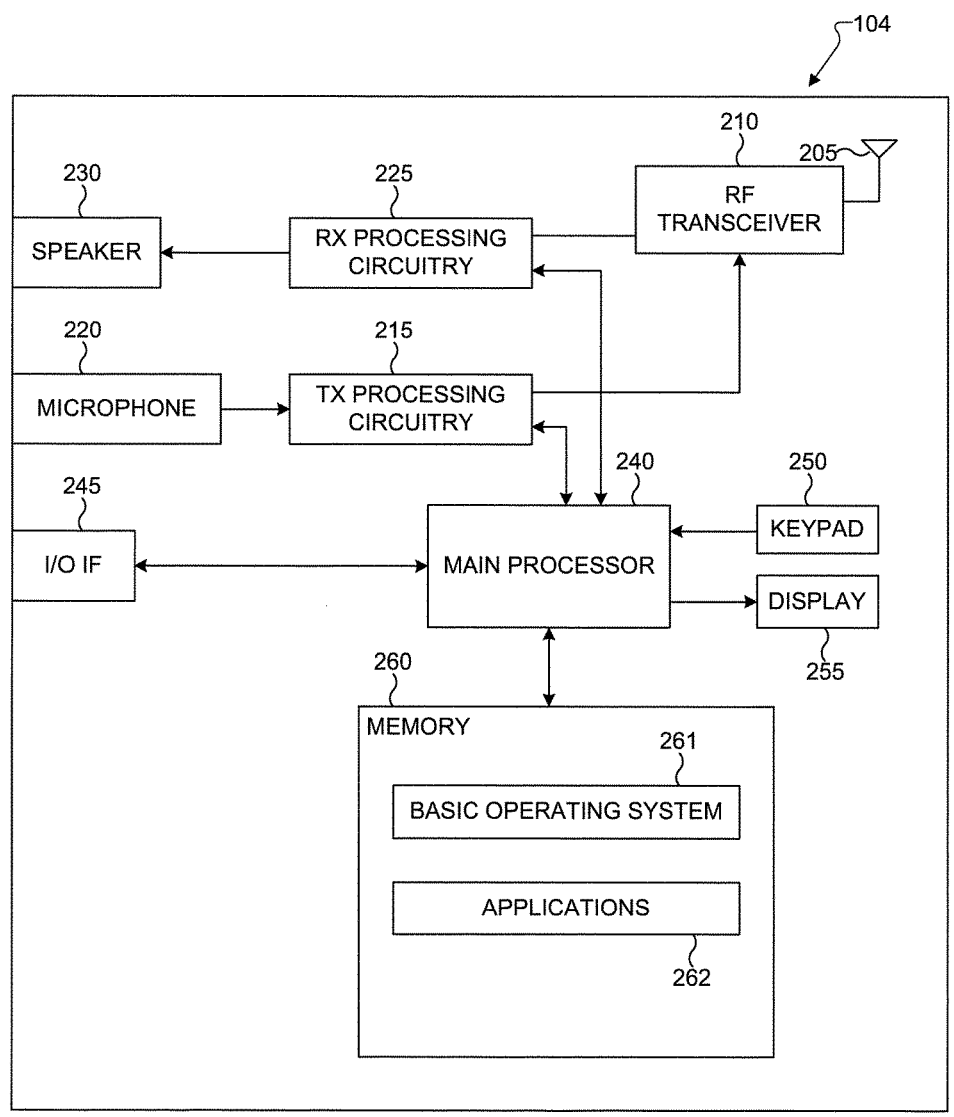
FIG. 2 illustrates an example station according to this disclosure.

FIG. 2 illustrates an example STA 104 according to this disclosure. The embodiment of the STA 104 illustrated in FIG. 2 is for illustration only, and the STAs 106-112 of FIG. 1 could have the same or similar configuration. However, STAs come in a wide variety of configurations, and FIG. 2 does not limit the scope of this disclosure to any particular implementation of a STA.

The STA 104 includes an antenna 205, a radio frequency (RF) transceiver 210, transmit (TX) processing circuitry 215, a microphone 220, and receive (RX) processing circuitry 225. The STA 104 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an AP 102 of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and execute the basic OS program 261 stored in the memory 260 in order to control the overall operation of the STA 104. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260, such as operations to support beam refinement in mmWave wireless systems. The main processor 240 can move data into or out of the memory 260 as required by an executing process. In some embodiments, the main processor 240 is configured to execute the applications 262 based on the OS program 261 or in response to signals received from AP 102 or an operator. The main processor 240 is also coupled to the I/O interface 245, which provides the STA 104 with the ability to connect to other devices such as laptop computers and handheld computers. The I/O interface 245 is the communication path between these accessories and the main controller 240.

The main processor 240 is also coupled to the keypad 250 and the display unit 255. The operator of the STA 104 can use the keypad 350 to enter data into the STA 104. The display 255 may be a liquid crystal display or other display capable of rendering text and/or at least limited graphics, such as from web sites.

The memory 260 is coupled to the main processor 240. Part of the memory 260 could include a random access memory (RAM), and another part of the memory 260 could include a Flash memory or other read-only memory (ROM).

Although FIG. 2 illustrates one example of STA 104, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the STA 104 configured as a mobile telephone or smartphone, STAs could be configured to operate as other types of mobile or stationary devices.

Figure 3:
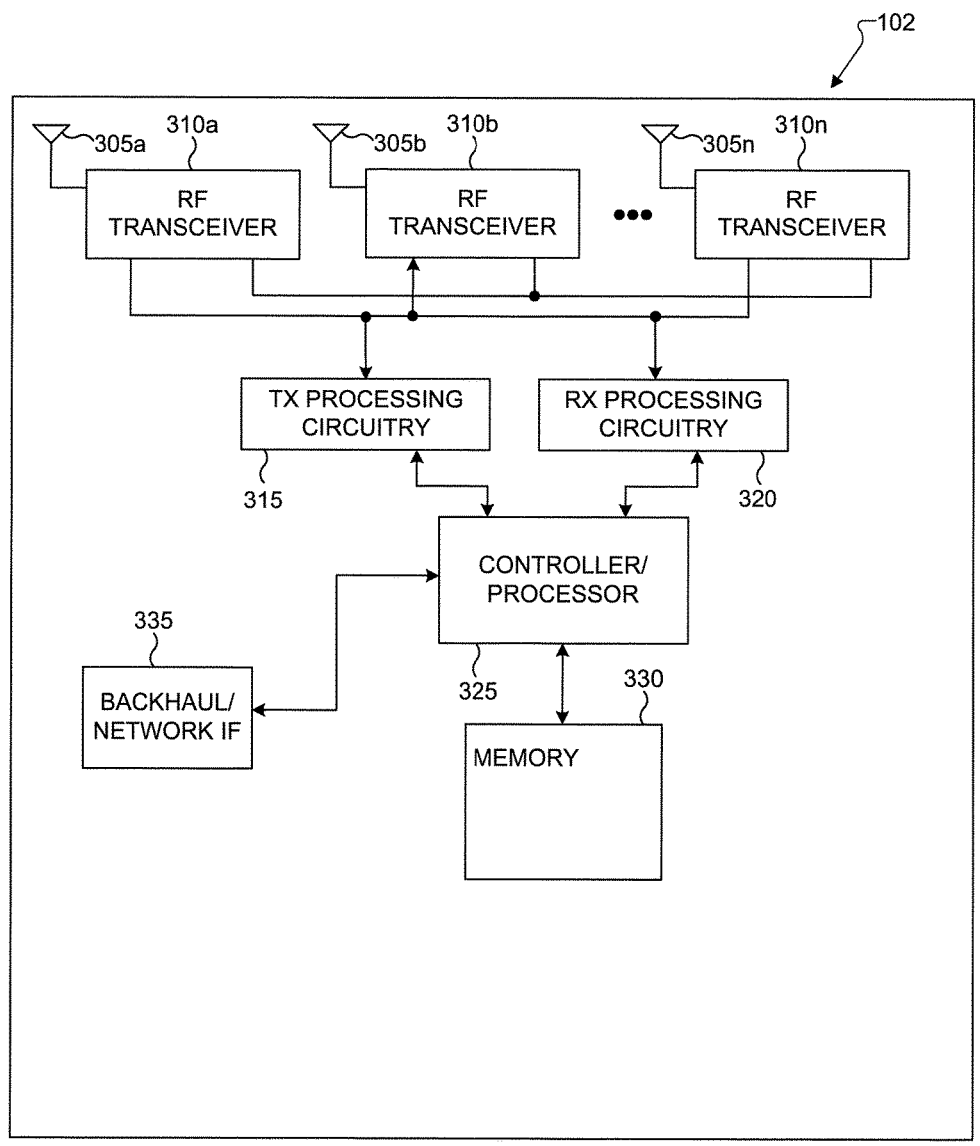
FIG. 3 illustrates an example access point according to this disclosure.

FIG. 3 illustrates an example AP according to this disclosure. The embodiment of the AP 102 shown in FIG. 3 is for illustration only, and other APs in embodiments of the present disclosure could have the same or similar configuration. However, APs come in a wide variety of configurations, and FIG. 3 does not limit the scope of this disclosure to any particular implementation of an AP.

The AP 102 includes multiple antennas 305a-305n, multiple RF transceivers 310a-310n, transmit (TX) processing circuitry 315, and receive (RX) processing circuitry 320. The AP 102 also includes a controller/processor 325, a memory 330, and a backhaul or network interface 335.

The RF transceivers 310a-310n receive, from the antennas 305a-305n, incoming RF signals, such as signals transmitted by STAs or other APs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 425 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the AP 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. Any of a wide variety of other functions could be supported in the AP 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the AP 102 to communicate with other devices or systems over a backhaul connection or over a network. The interface 335 could support communications over any suitable wired or wireless connection(s). For example, when the AP 102 is implemented as part of a cellular communication system (such as one supporting 5G, LTE, or LTE-A), the interface 335 could allow the AP 102 to communicate with eNBs over a wired or wireless backhaul connection. When the AP 102 is implemented as an access point, the interface 335 could allow the AP 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the AP 102 (implemented using the RF transceivers 310a-310n, TX processing circuitry 415, and/or RX processing circuitry 320) support communication operations in mmWave wireless. The transmit and receive paths of the AP 102 are configured to support beam refinement in mmWave wireless systems.

Although FIG. 3 illustrates one example of an AP 102, various changes may be made to FIG. 3. For example, the AP 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the AP 102 could include multiple instances of each (such as one per RF transceiver).

Figure 4:
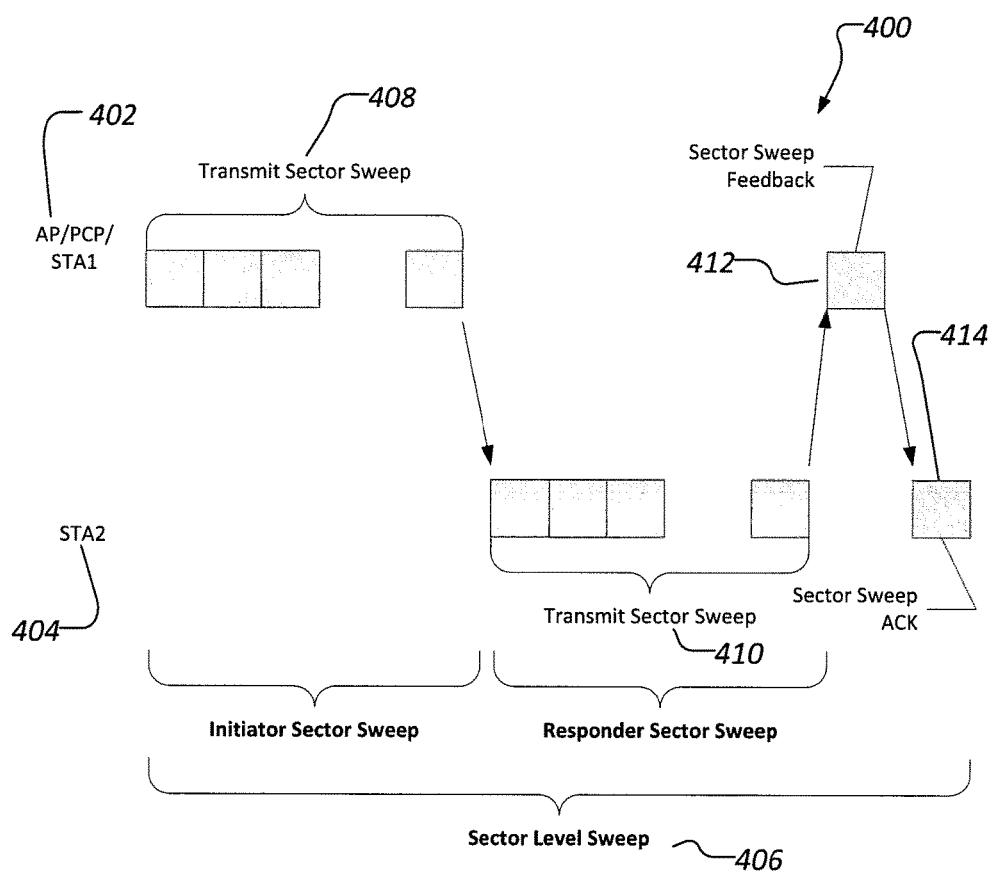
FIG. 4 illustrates an example beamforming procedure in IEEE 802.11 ad according to this disclosure.

FIG. 4 illustrates an example beamforming procedure in IEEE 802.11 ad according to this disclosure. The embodiment of the beamforming procedure shown in FIG. 4 is for illustration only, and other beamforming procedures in embodiments of the present disclosure could have the same or similar configuration.

FIG. 4 illustrates an example beamforming (BF) procedure 400 used in IEEE 802.11ad for a node 402 such as an Access Point (AP), personal basic service set (PBSS) control point (PCP) or a station (STA)) to initiate the attachment with another STA 404. In this case, the node 402 includes an AP 102 and the STA 404 includes a STA2 106. The BF procedure includes a bidirectional sequence of BF training frame transmissions that uses sector sweep and provides the necessary signaling to allow each STA to determine appropriate antenna system settings for both transmission and reception. BF training starts with a sector level sweep (SLS) 406 from the initiator. In this case, the initiator is the node 402. The purpose of the SLS 406 phase is to enable communications between the two participating STAs at the control PHY rate or higher MCS. Normally, the SLS 406 phase provides only transmit BF training. At the start of the transmit sector sweep 408, the responder, in this case station 404, should have its receiving antenna configured to a wide beam (e.g. quasi-omni) pattern, followed by transmit sector sweep 410 by the responder. At the end of the sector sweep phase, both the node 402 and the STA2 402 (e.g. AP/PCP and STA) will have completed the transmit beamforming and the best sector is fed back for use in data communication. In this case, the sector sweep phase is followed by the node 402 transmitting a sector sweep feedback 412 to which the STA 404 responds by transmitting a sector sweep acknowledgement (ACK) 414. A beam refinement protocol (BRP) may follow, if requested by either the initiator or the responder.

Figure 5:
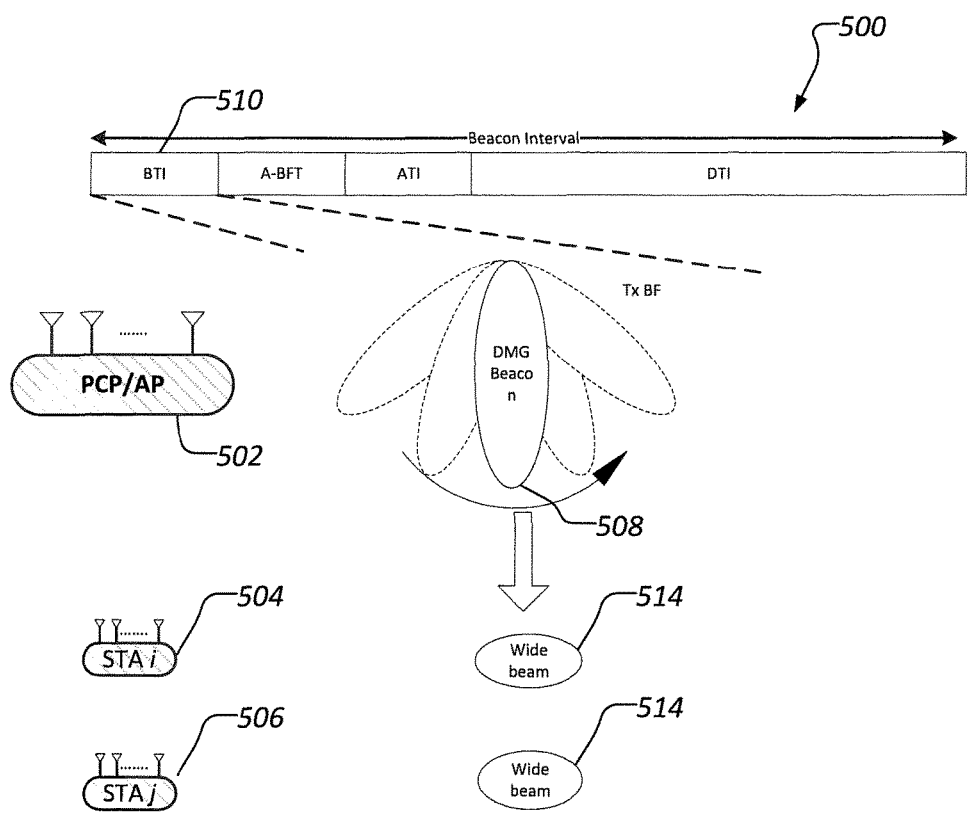
FIG. 5 illustrates an example DMG beaconing procedure in IEEE 802.11 ad according to this disclosure.

FIG. 5 illustrates an example beaconing procedure in IEEE 802.11 ad according to this disclosure. The embodiment of the beaconing procedure shown in FIG. 5 is for illustration only, and other beaconing procedures in embodiments of the present disclosure could have the same or similar configuration.

FIG. 5 illustrates an example beaconing procedure 500 used in IEEE 802.11 ad to start the STA association procedure. Though the terms AP/PCP and STA are used for nodes of the beaconing procedure 500, for purposes of discussion of FIG. 5, the terms can be used interchangeably. In certain embodiments a node 502 includes an AP 102, a node 504 includes a STA1 104, and a node 506 includes a STA2 106.

The AP/PCP or node 502 starts transmitting beacons, in this case, directional multi-gigabit (DMG) beacons 508, using a transmit sector sweep during the beacon transmission interval (BTI) 510. All STAs, such as nodes 504 and 506, that wish to associate with the PCP/AP are in their receive mode during this transmission using a wide pattern 514 or quasi-omni pattern. Each STA, namely nodes 504 and 506, record the best directions for reception from the PCP/AP or node 502 and feeds back the direction information to the PCP/AP or node 502 during the association process.

Figure 6:
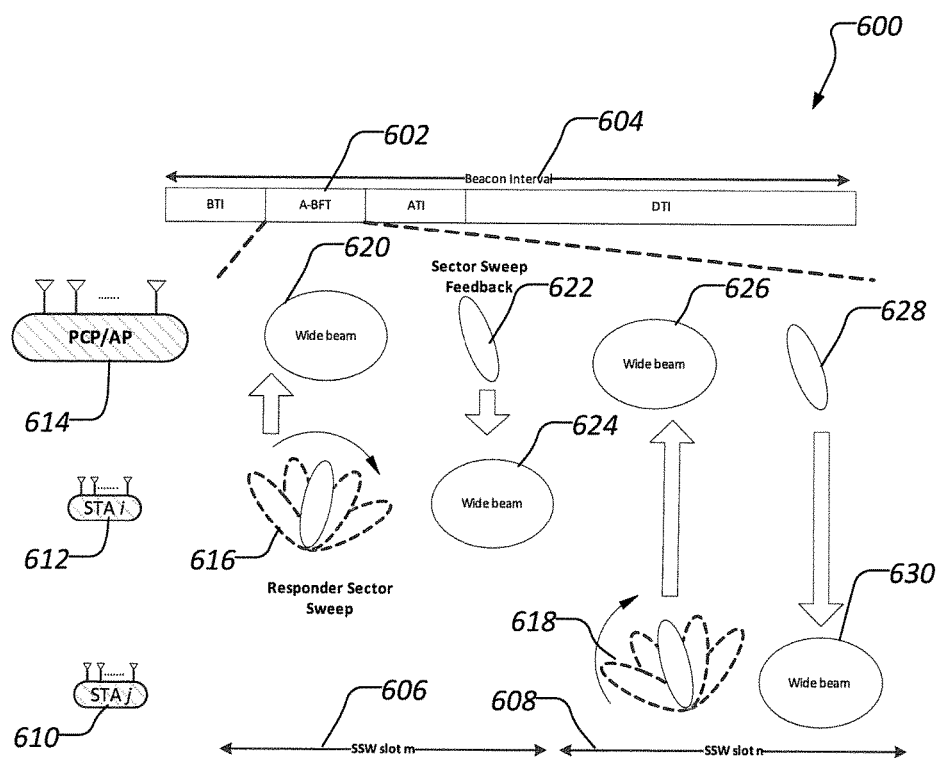
FIG. 6 illustrates an example association procedure using A-BFT in IEEE 802.1 lad according to this disclosure.

FIG. 6 illustrates an association procedure in IEEE 802.11 ad according to this disclosure. The embodiment of the association procedure shown in FIG. 6 is for illustration only, and other association procedures in embodiments of the present disclosure could have the same or similar configuration.

FIG. 6 illustrates an example association procedure 600 using an association beamforming training (A-BFT) period 602 of a beacon interval 604. In the A-BFT period 602, time is divided into multiple association slots (called sector sweep slots or SSW slots) determined by the beacon (up to a maximum of 8 slots in IEEE 802.11ad). A SSW slot m 606 and a SSW slot n 608 are included in this embodiment. Each STA, such as nodes 610 (labeled STA i) and 612 (labeled STA j) randomly picks one of the SSW slots 606 and 608 slots for transmission to the node 614 (labeled PCP/AP). The stations perform their own sector sweeps during the slot time where it transmits multiple SSW frames with different sector IDs. For example, node 612 performs a responder sector sweep 616 during the duration of the SSW slot m 606 and node 610 performs a responder sector sweep 618 during the duration of the SSW slot n 608. During the transmission of the responder sector sweep 616, the node 614 utilizes a quasi-omni antenna pattern or a wide beam 620 antenna pattern and the node 614 records the best sector to receive transmission from the node 616. The node 614 or PCP/AP then transmits and feeds back the best sector ID to the node 612 using a SSW feedback 622 while the node 612 utilizes a wide beam 624 antenna pattern. If there is a collision at the node 614, which is detected by lack of SSW feedback from the PCP/AP to the STA requesting association, the STA retries during the next beacon interval. During the SSW slot n 608, the above-described process is repeated, but between the node 610 and the node 614 utilizing the responder sector sweep 618, the wide beam 626, the sector sweep feedback 628, and the wide beam 630. It is clear that each node such as nodes 610 and 612 attempting to associate with node 614 takes a turn in attempting association and the attempt to associate occur sequentially within the A-BFT 602 using one SSW slot per node or STA attempting to associate.

Figure 7:
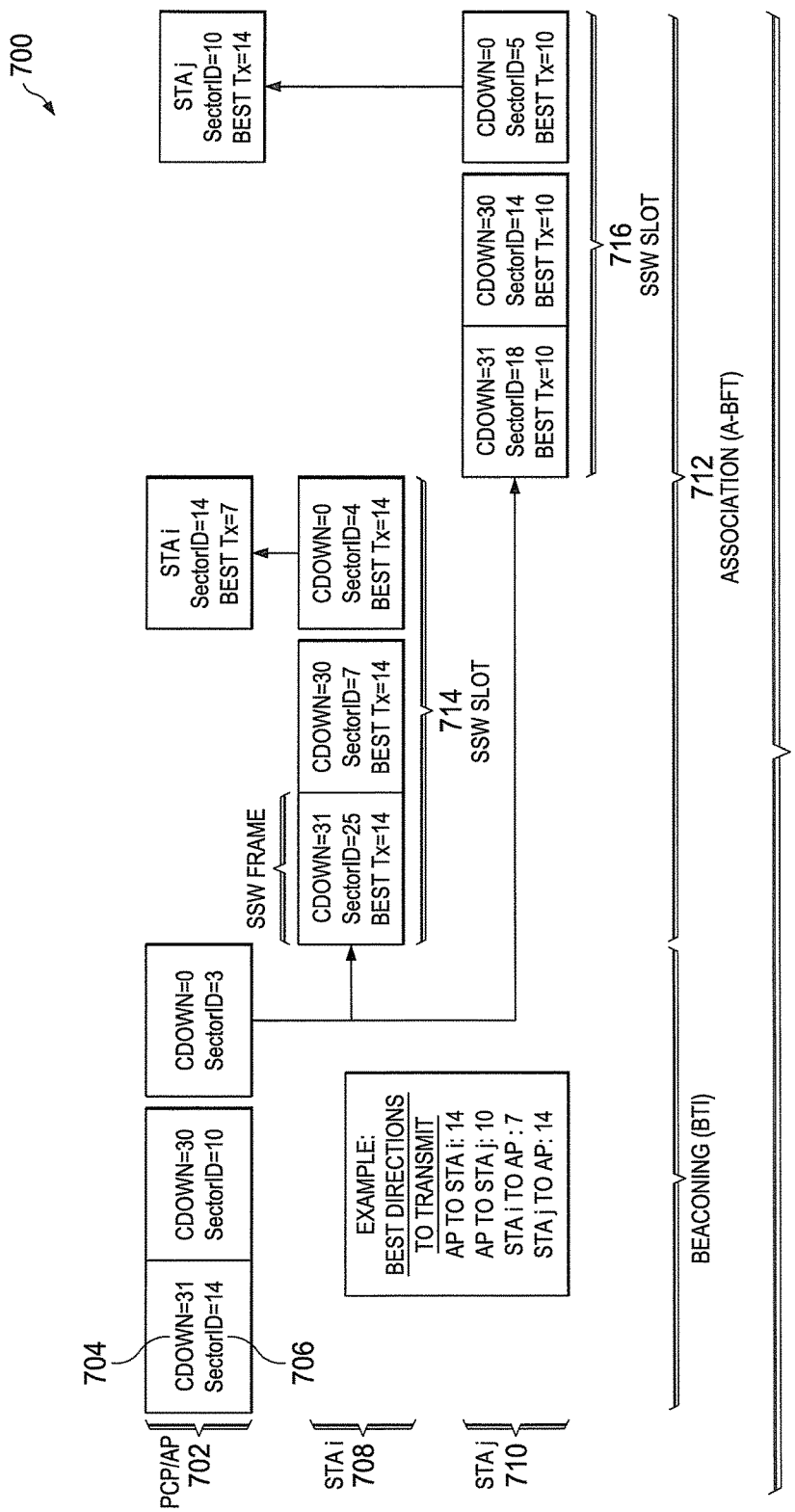
FIG. 7 illustrates an example sector sweep procedure in IEEE 802.11ad according to this disclosure.

FIG. 7 illustrates an example sector sweep procedure for association in IEEE 802.11 ad according to this disclosure. The embodiment of the sector sweep procedure for association shown in FIG. 7 is for illustration only, and other sector sweep procedures for association in embodiments of the present disclosure could have the same or similar configuration.

FIG. 7 illustrates an example sector sweep procedure 700 for association in IEEE 802.11ad. The PCP/AP 702 transmits in multiple directions using a countdown (CDOWN) 704 reporting sector ID 706 during beacon transmissions. The STAs STA i 708 and STA j 710 are in a wide beam (e.g. quasi-omni) mode during this time and record the best transmit sector ID from the PCP/AP for reception. In this example, STA i 708 finds sector ID=14 from PCP/AP 702 while STA j 710 finds sector ID=10 as the best sector ID from the PCP/AP 702. During the A-BFT interval 712, STA i 708 finds the first transmission SSW slot 714 within the A-BFT 712 and STA j 710 finds the second transmission SSW slot 716 within the A-BFT 712. The PCP/AP 702 is in the wide beam (e.g. quasi-omni) mode during the first and second transmission SSW slots 716, 718. The PCP/AP 702 finds sector ID=7 as the best ID for STA i 708 and sector ID=14 as the best ID for STA j 710. Thus, at the end of the SSW, all STAs 708, 710 and the PCP/AP 702 know the best transmit sector ID. Table 1 below summarizes which best transmit sector IDs are transmitted during SLS.

TABLE 1

| Transmission during SLS | Best transmit sector ID |
|---|---|
| PCP/AP to STA i | 14 |
| PCP/AP to STA j | 10 |
| STA i to PCP/AP | 7 |
| STA j to PCP/AP | 14 |

Figure 8:
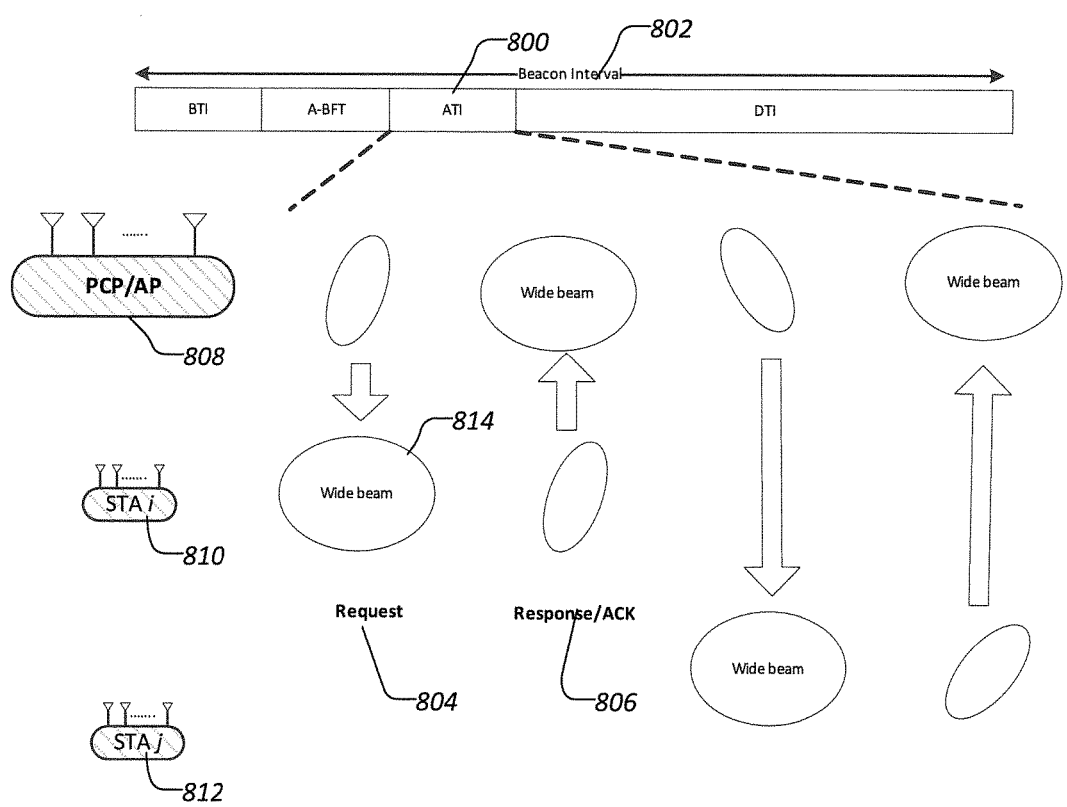
FIG. 8 illustrates an example announcement time interval (ATI) procedure in IEEE 802.1 lad according to this disclosure.

FIG. 8 illustrates an example announcement time interval in IEEE 802.11ad according to this disclosure. The embodiment of the announcement time interval shown in FIG. 8 is for illustration only, and other announcement time interval in embodiments of the present disclosure could have the same or similar configuration.

FIG. 8 illustrates an example announcement time interval (ATI) period 800 of the beacon interval 802 in IEEE 802.11 ad. During the ATI 800, request 804 and response 806 exchanges occur between a PCP/AP 808 and each associated STA sequentially, namely STA i 810 and STA j 812. The PCP/AP 808 transmits using its best sector ID for each STA while the STA is configured to operate in the quasi-omni pattern mode or wide beam 814 mode. Beam refinement frame messages to set up further beam refinement for a better signal to noise ratio (SNR) for data communication during the data transmission interval (DTI).

Figure 9:
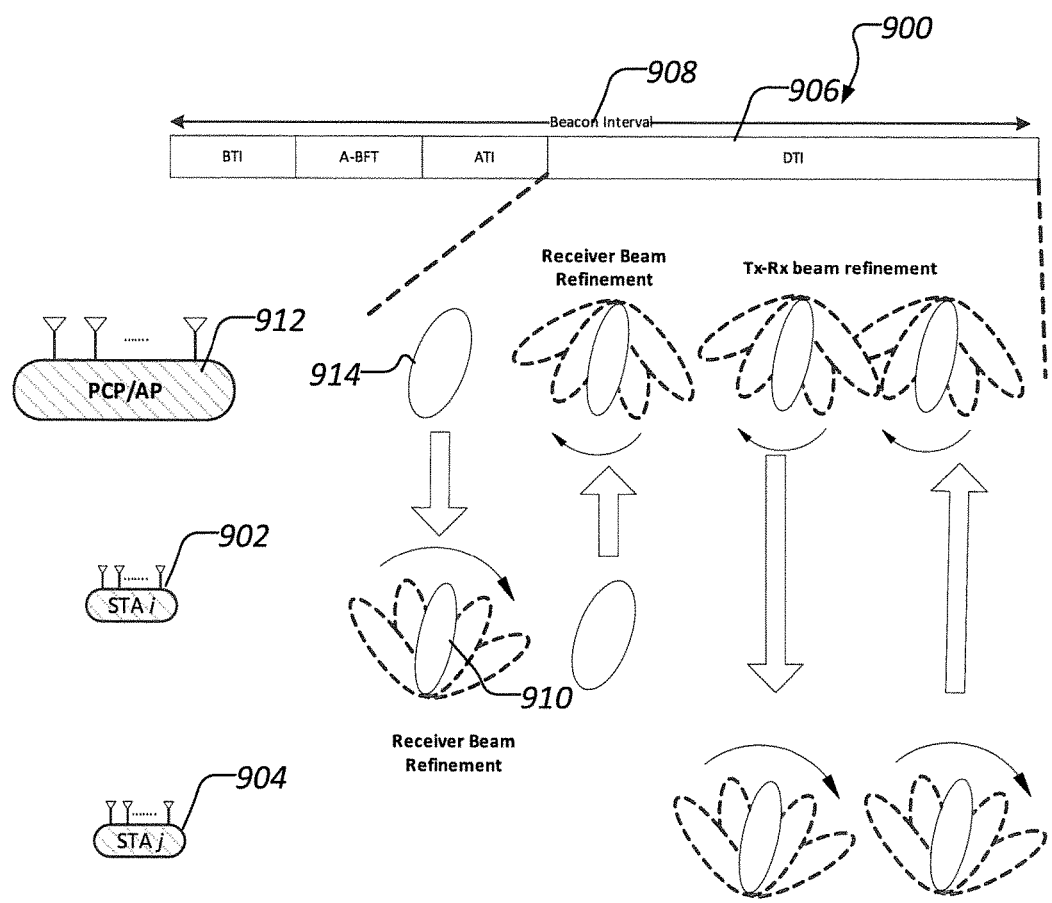
FIG. 9 illustrates an example beam refinement protocol in IEEE 802.11ad according to this disclosure.

FIG. 9 illustrates an example beam refinement protocol (BRP) in IEEE 802.11ad according to this disclosure. The embodiment of the beam refinement protocol shown in FIG. 9 is for illustration only, and other beam refinement protocols in embodiments of the present disclosure could have the same or similar configuration.

FIG. 9 illustrates an example beam refinement protocol (BRP) 900 in IEEE 802.11ad. BRP 900 is a process where stations, such as STA i 902 and STA j 904, train transmit (TX) and receive (RX) antenna arrays and improve and refine their beamforming configuration through iterative search to provide increased throughput. This process is performed during the data transmission interval (DTI) 906 part of the beacon interval 908. One of the important goals in the BRP 900 is to provide a finer receiver beam 910 with an aim to provide an increase in receiver beamforming gain, leading to improved data rates. In a first method called multiple sector ID detection (MID), the transmitting node, such as PCP/AP 912 uses a wide beam 914 (e.g. quasi-omni) while the receiving node sweeps through choice antenna weight vectors (AWVs) to determine the RX settings that have the best link quality. In a second method called beam combining (BC), multiple RX AWVs are tested together with multiple TX AWVs. Both methods can be used independently or in together to provide the required beam refinement. The refined beams provide increased SNR to the receiving node, enabling higher data rate communication for data transfer.

Figure 10:
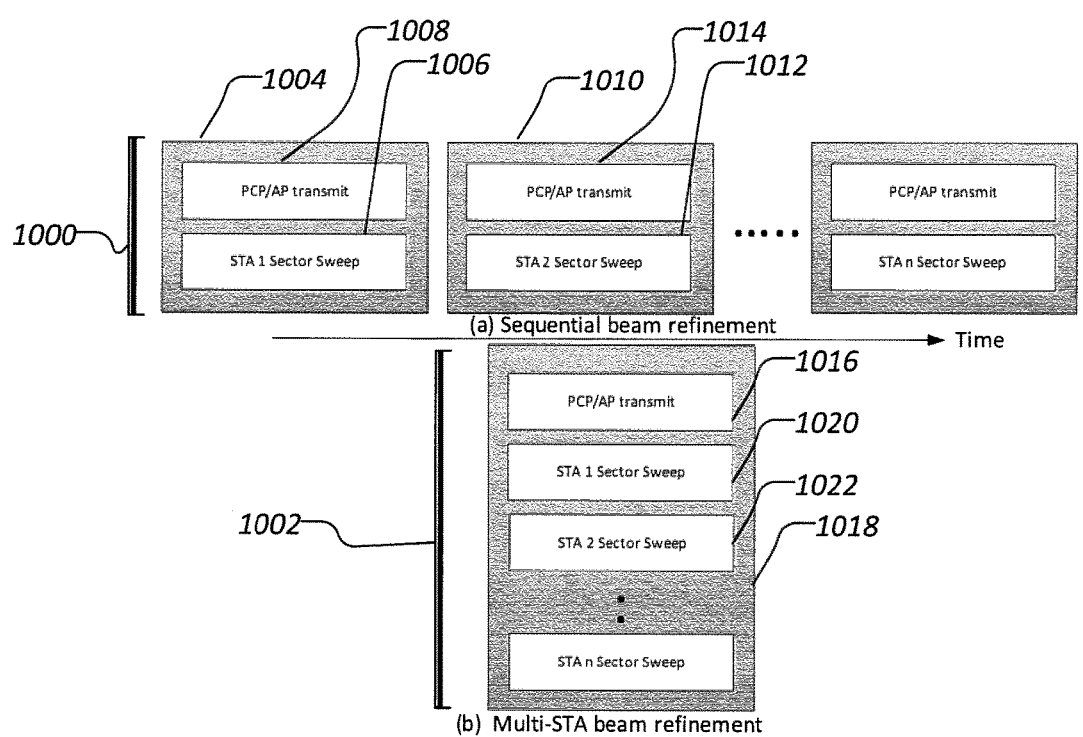
FIG. 10 illustrates an example comparison between a beam refinement procedure in IEEE 802.11 ad and a multiple station beam (Multi-STA) refinement procedure according to this disclosure.

FIG. 10 illustrates an example multiple station beam refinement protocol (Multi-STA BRP) according to this disclosure. The embodiment Multi-STA BRP shown in FIG. 10 is for illustration only, and other Multi-STA BRPs in embodiments of the present disclosure could have the same or similar configuration.

FIG. 10 illustrates a comparison between a sequential BRP protocol 1000, such as BRP 900, and a Multi-STA BRP 1002. The sequential BRP 1000 operates in a sequential and per STA basis that requires a significant amount of overhead for beam refinement of multiple STAs. In sequential BRP 1000, during a first time period 1004, a STA1 sector sweep 1006 is performed while a PCP/AP transmission 1008 is performed. Next, in a second time period 1010, a STA1 sector sweep 1012 is performed while a PCP/AP transmission 1014 is performed. This sequential process is repeated n times, once for each STA. However, when utilizing the Multi-STA BRP protocol 1002, while a PCP/AP 1016 is transmitting beam refinement frames in a sector during a first time period 1018, all the STAs, such as STA 1 1018 and STA 2 1020, in that sector utilize the transmission to refine their beams. This simultaneous multiple station sector sweeping reduces latency and boosts the overall throughput of a network.

Figure 11:
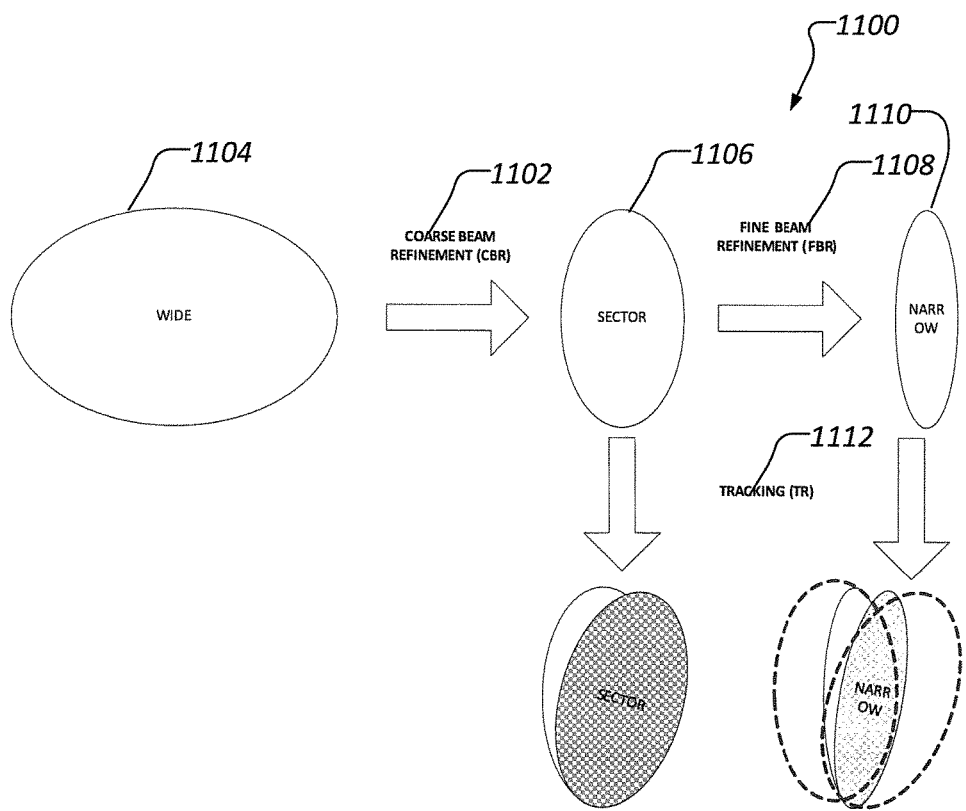
FIG. 11 illustrates an example of beam refinement phases according to this disclosure.

FIG. 11 illustrates an example phases of a beam refinement procedure according to this disclosure. The embodiment of phases of beam refinement shown in FIG. 11 is for illustration only, and other phases of beam refinement in embodiments of the present disclosure could have the same or similar configuration.

FIG. 11 illustrates the distinct phases of beam refinement 1100, which iteratively reduce the beamwidth and improve the data communication range and SNR via beamforming with narrower beams. During a coarse beam refinement (CBR) phase 1102, a wide beam 1104 is refined to the accuracy of a sector beam 1106. Next, in a fine beam refinement (FBR) phase 1108, the sector beam 1106 is further refined into a narrow beam 1110. In addition, beam tracking (TR) 1112 is engaged to track the beams at different times to support mobility or temporary blockages. The beam tracking process does not change the beamwidth but tracks the beams across sectors or across narrow beams, in order to provide the best link quality.

Figure 12:
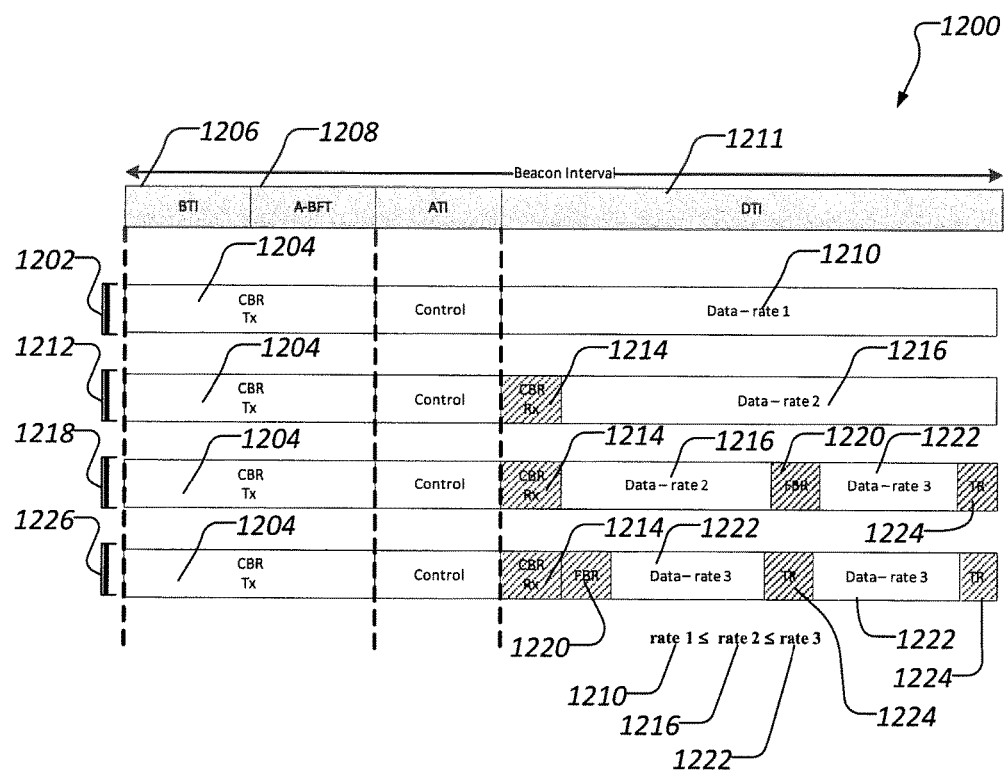
FIG. 12 illustrates example multiuser beam refinement modes according to this disclosure.

FIG. 12 illustrates an example of multi-user beam refinement modes according to this disclosure. The embodiments of multi-user beam refinement modes shown in FIG. 12 is for illustration only, and other multi-user beam refinement modes in embodiments of the present disclosure could have the same or similar configuration.

FIG. 12 shows multi-user beam refinement modes 1200. In a first mode 1202, with only Tx beam refinement (CBR-Tx) 1204 attained by BTI 1206 and A-BFT 1208, the STAs will operate at a given rate 1 1210 during the DTI 1211. In a second mode 1212, with CBR-Rx 1214 in addition to CBR-Tx 1204, the sector level beams (which are narrower than the wide beams) are obtained at the receiver as well, thereby providing an even higher SNR at the receiver, thereby enabling them to operate at a data rate 2 1216 that is higher than rate 1 1210. In a third mode 1218, with FBR 1220 in addition to CBR-Rx 1214 and CBR-Tx 1204, the beam widths can be further refined to provide a data rate 3 1222 even higher data rate 2 1216. Beam tracking TR 1224 is applied after FBR 1220 in order to track the beams for mobility or temporary blockages to sustain the best data rates that can be obtained at a given level of beam refinement. In a fourth mode 1226, FBR 1220 is conducted after CBR Rx 1214 and without first operating a rate 2 1216.

Figure 13:
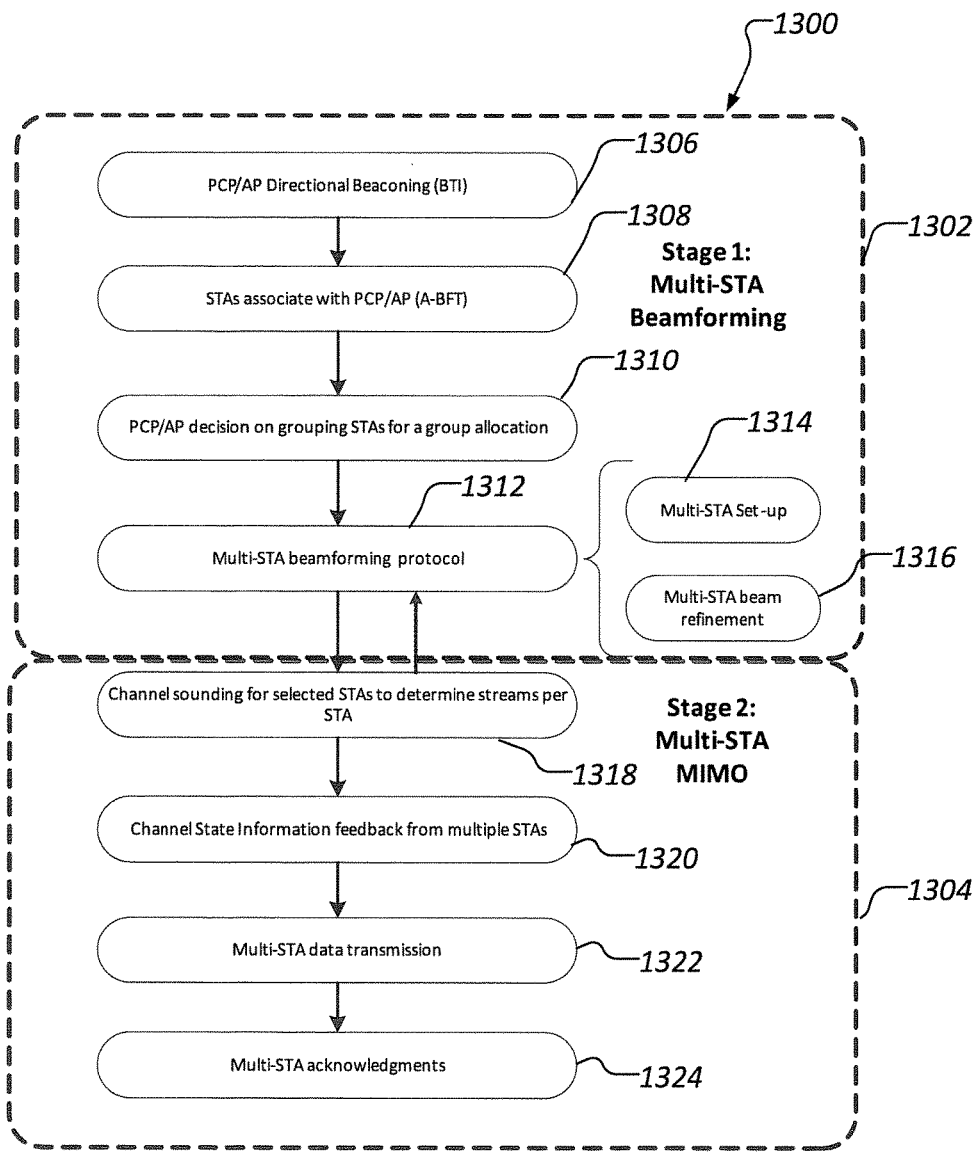
FIG. 13 illustrates an example Multi-STA beamforming procedure according to this disclosure.

FIG. 13 illustrates an example of a Multi-STA beamforming and beam refinement protocol according to this disclosure. The embodiment of Multi-STA beamforming and beam refinement protocol shown in FIG. 13 is for illustration only, and other Multi-STA beamforming and beam refinement protocols in embodiments of the present disclosure could have the same or similar configuration.

FIG. 13 illustrates a multi-STA beamforming and beam refinement protocol 1300. The protocol 1300 includes two stages, a Multi-STA beamforming stage 1302 followed by a Multi-STA MIMO stage 1304. The multi-STA beamforming stage 1302 starts after the beaconing procedures 1306 and association procedures 1308 are completed. By the end of the association procedures 1308, the transmit beamforming has been completed for the PCP/AP and the associated STAs and thus, the best beams to transmit between the PCP/AP and STAs is known. Next, grouping procedures 1310 are conducted and the PCP/AP first decides on the STAs to group together for transmission. Several factors can be involved in achieving this grouping, including, but not limited to, the link quality between the PCP/AP and the STAs, the best sector ID to transmit to STAs, and the capability of STAs to provide Multi-STA support. Next, a Multi-STA beamforming procedure 1312 is initiated by setting up a multi-STA session 1314 using dedicated time in the service period/contention based access period (SP/CBAP) in the DTI and a Multi-STA BRP frame is utilized to indicate to the STAs that they are now part of a multi-STA BRP session. Next, a multi-STA BRP session 1316 conducts beam refinement for multiple users simultaneously rather than sequentially. At the end of the multi-STA BRP session 1316, the PCP/AP and the STAs know the best directions for transmit and receive beamforming for exchanging data. The beam width of the transmitter and receiver is now fixed for the Multi-STA MIMO stage 1304.

The Multi-STA MIMO stage 1304 follows the Multi-STA BF stage. The Multi-STA MIMO stage 1304 begins by performing channel sounding procedures 1318, during which the channel is sounded for the selected STAs to determine the number of streams to be transmitted to each STA. This can be done in a process similar to the channel sounding performed in IEEE 802.11ac, which uses null data packet (NDP) transmissions or using a staggered preamble to expand the number of long training symbols. The channel sounding is only performed in the directions determined by the Multi-STA BF stage 1302. At 1320, the channel state information is then fed back to the PCP/AP, which makes the decision on the number of streams to be transmitted to each STA in the Multi-STA MIMO transmission. The multi-STA data transmission 1322 and acknowledgements 1324 occur thereafter. Any change in beam width or beam direction requires a new beam refinement and new channel sounding operation to be performed.

A multi-STA BRP frame is transmitted from the PCP/AP to indicate to the STAs that they are a part of the Multi-STA BRP. The content of an example Multi-STA BRP frame is shown in Table 2. The multi-STA BRP frame includes the SSW sweep duration and the duration of each BRP-FBCK, the PCP/AP information (e.g. association ID (AID), best sector ID and so forth), the list of STAs involved in the Multi-STA BRP, the number of times the AP will repeat its SSW, the refinement type such as CBR, FBR or TR and the best narrow beam ID for fine refinement (if needed).

TABLE 2

Multi-STA BRP announcement frame structure

| Order | Information |
| --- | --- |
| n | |
| n + 1 | Duration of SSW (aSSDuration) |
| n + 2 | Duration of each BRP-FBCK (aSSWFBCKDuration) |
| n + 3 | PCP/AP info (AID,Best Sector ID, Tx/Rx/Both) |
| n + 4 | STA list: STA1 info (AID), STA2 info (AID), STA n info (AID) |
| n + 5 | AP SSW repetitions (aSSRep) |
| n + 6 | Refinement type (CBR, FBR, TR) |
| n + 7 | Best Narrow beam ID (fine) |
| n + 8 | |

Figure 14:
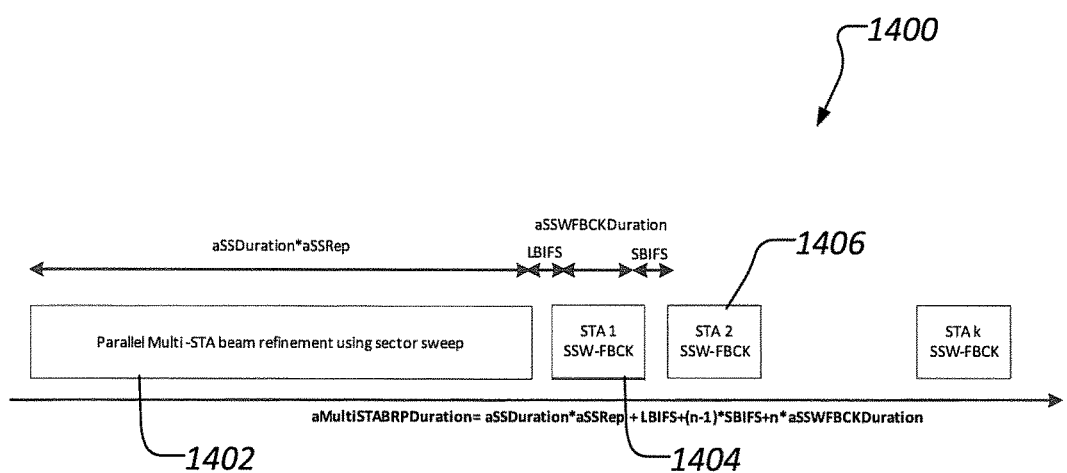
FIG. 14 illustrates an example Multi-STA BRP operation according to this disclosure.

FIG. 14 illustrates an example of a Multi-STA BRP operation according to this disclosure. The embodiment of Multi-STA BRP operation shown in FIG. 14 is for illustration only, and other Multi-STA BRP operations in embodiments of the present disclosure could have the same or similar configuration.

In the example shown in FIG. 14, the Multi STA BRP operation 1400 begins with a parallel multi-station beam refinement procedure 1402 using sector sweep. The operation 1402 has a duration equal to aSSDuration*aSSRep. During the procedure 1402, an AP (or multi-STA) sweeps the beam over multiple repetitions while the multi-STA (or AP) beams remain fixed at a given direction for receive beam refinement. After the procedure 1402, the multi-STA (or AP) sends feedback, such as STA 1 SSW-FBCK 1404 and STA 2 SSW-FBCK 1406, on whether the beam refinement was successful and whether any additional beam training is needed. Each feedback has a duration equal to aSSWFBCKDuration. Accordingly, the entire operation 1400 has a time duration, aMultiSTABRPDuration, equal to aSSDuration*aSSRep+LBIFS+(n−1)*SBIFS+n*aSSWFBCKDuration.

Figure 15:
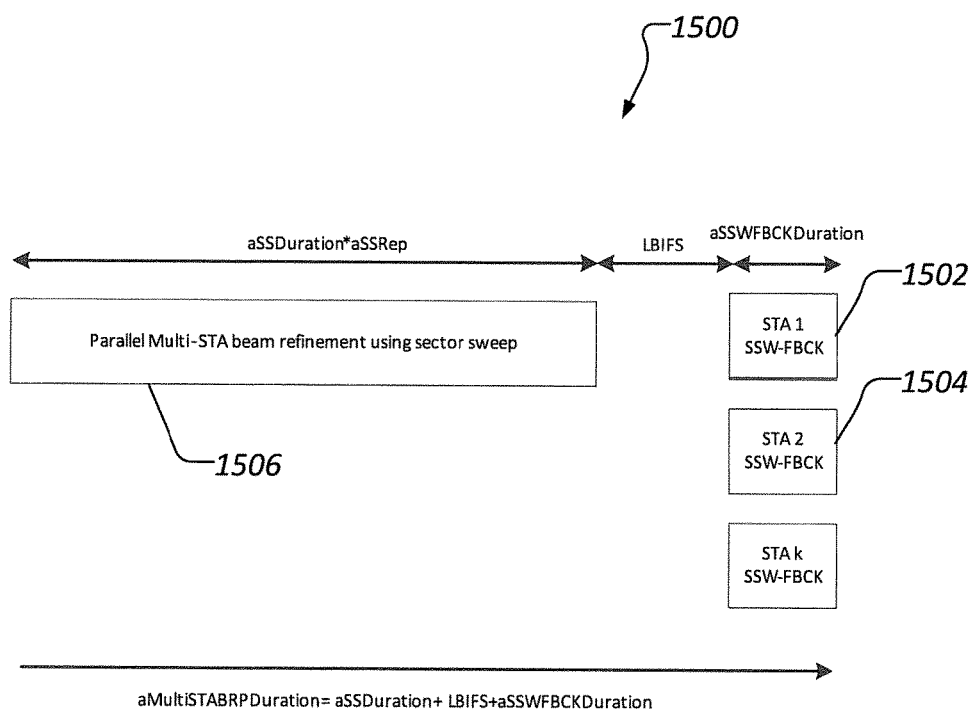
FIG. 15 illustrates an example Multi-STA BRP operation with parallel feedback according to this disclosure.

FIG. 15 illustrates another example of a Multi-STA BRP operation according to this disclosure. The embodiment of Multi-STA BRP operation shown in FIG. 15 is for illustration only, and other Multi-STA BRP operations in embodiments of the present disclosure could have the same or similar configuration.

FIG. 15 illustrates a Multi-STA BRP operation 1500 in which feedback, such as STA1 SSW-FBCK 1502 and STA2 SSW-FBCK 1504, are sent in parallel because the AP determined that the feedback will not have collisions. This is possible for cases such as space division multiple access (SDMA) where multiple transmissions in different directions could occur without collisions. In this case, the operation 1500 begins with a parallel multi-station beam refinement procedure 1506 using sector sweep. The operation 1506 has a duration equal to aSSDuration*aSSRep. During the procedure 1506, an AP (or multi-STA) sweeps the beam over multiple repetitions while the multi-STA (or AP) beams remain fixed at a given direction for receive beam refinement. After the procedure 1506, the multi-STA (or AP) sends STA1 SSW-FBCK 1502 and STA2 SSW-FBCK 1504 on whether the beam refinement was successful and whether any additional beam training is needed. Since the feedback in this example is sent simultaneously, the feedback collectively has a duration equal to aSSWFBCKDuration. Accordingly, the entire operation 1500 has a time duration, aMultiSTABRPDuration, equal to aSSDuration*aSSRep+LBIFS+aSSWFBCKDuration.

Three examples of multi-STA BRP operation are described below. A first case where AP is transmitting BRP to multiple STAs with same sector ID (see FIG. 16), a second case where an AP is transmitting BRP to multiple STAs with different sector IDs (see FIG. 17), and a third case where multi-STAs are transmitting BRP to an AP (see FIG. 18). In each of these cases, it is assumed that the STA capability is not changed and the multi-STA operation by the AP is made transparent to the STA (i.e., the STA need not know). The cases also assume that Tx BRP is done via sector level sweep (SLS) during beacon and association periods.

Figure 16:
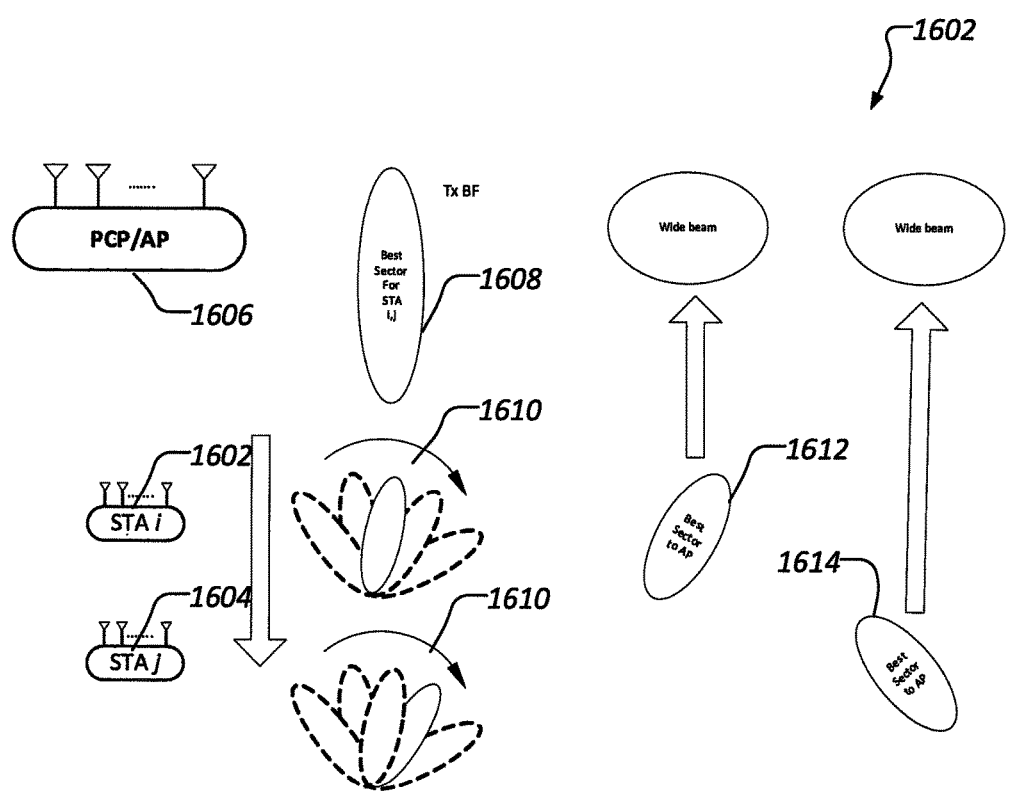
FIG. 16 illustrates an example coarse beam refinement procedure where all stations have the same best sector ID according to this disclosure.

FIG. 16 illustrates another example of a Multi-STA BRP operation according to this disclosure. The embodiment of Multi-STA BRP operation shown in FIG. 16 is for illustration only, and other Multi-STA BRP operations in embodiments of the present disclosure could have the same or similar configuration.

FIG. 16 illustrates an example Multi-STA BRP operation 1600 for station receive coarse beam refinement where all STAs, such as STA i 1602 and STA j 1604, have the same best sector ID of a PCP/AP 1606. Using the best sector ID, a PCP/AP 1606 send and announcement 1608 to the desired STAs, STA i 1602 and STA j 1604, that it will perform BRP. STAs that have been informed about Rx BRP, will perform Rx SS 1610 during this transmission. In response, STAs will provide feedback, such as feedback 1612 STA i 1602 and feedback 1614 of STA j 1604, to the PCP/AP 1606 regarding whether the Rx BRP was sufficient and whether further Rx BRP is required. Feedback, such as feedback 1612 and 1614, will be sent in the direction of best Tx sector ID for transmission to the PCP/AP 1606. The SSW can be repeated aSSRep times to improve the Rx BRP. While feedback 1612 and 1614 are shown as being transmitted sequentially, in certain embodiments where the PCP/AP 1606 can ensure collision avoidance, feedback such as feedback 1612 and 1614 can be transmitted in parallel.

Figure 17:
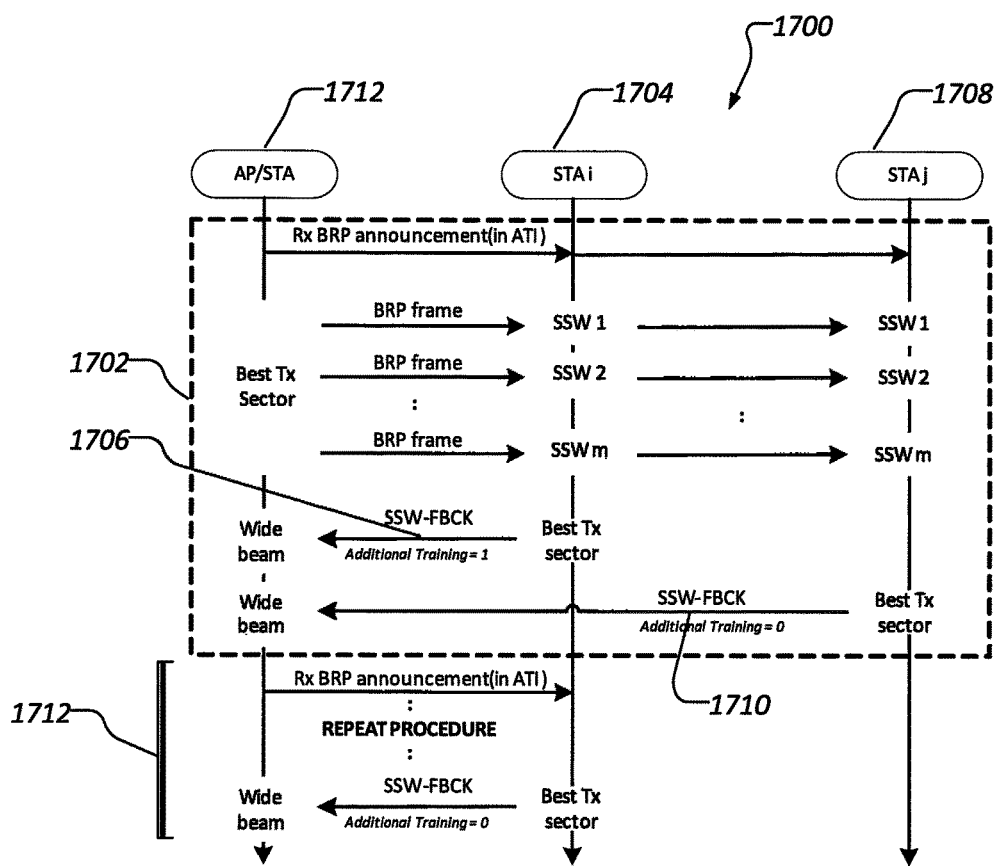
FIG. 17 illustrates an example coarse beam refinement procedure where all stations have the same best sector ID and a station indicates a need for additional beam training according to this disclosure.

FIG. 17 illustrates another example of a Multi-STA BRP operation according to this disclosure. The embodiment of Multi-STA BRP operation shown in FIG. 17 is for illustration only, and other Multi-STA BRP operations in embodiments of the present disclosure could have the same or similar configuration.

FIG. 17 illustrates an example of Multi-STA BRP operation 1700 for receive beam refinement where during a first iteration 1702 of the operation 1700, a STA i 1704 provides an indication 1706 of a need for additional beam forming training and a STA j 1708 provides an indication 1710 of no need for additional training. Because STA i 1704 provided indication 1706 to AP/STA 1712, the AP/STA 1712 conducts a subsequent or second iteration 1714 of the Multi-STA BRP operation 1700 with STA j 1708.

Figure 18:
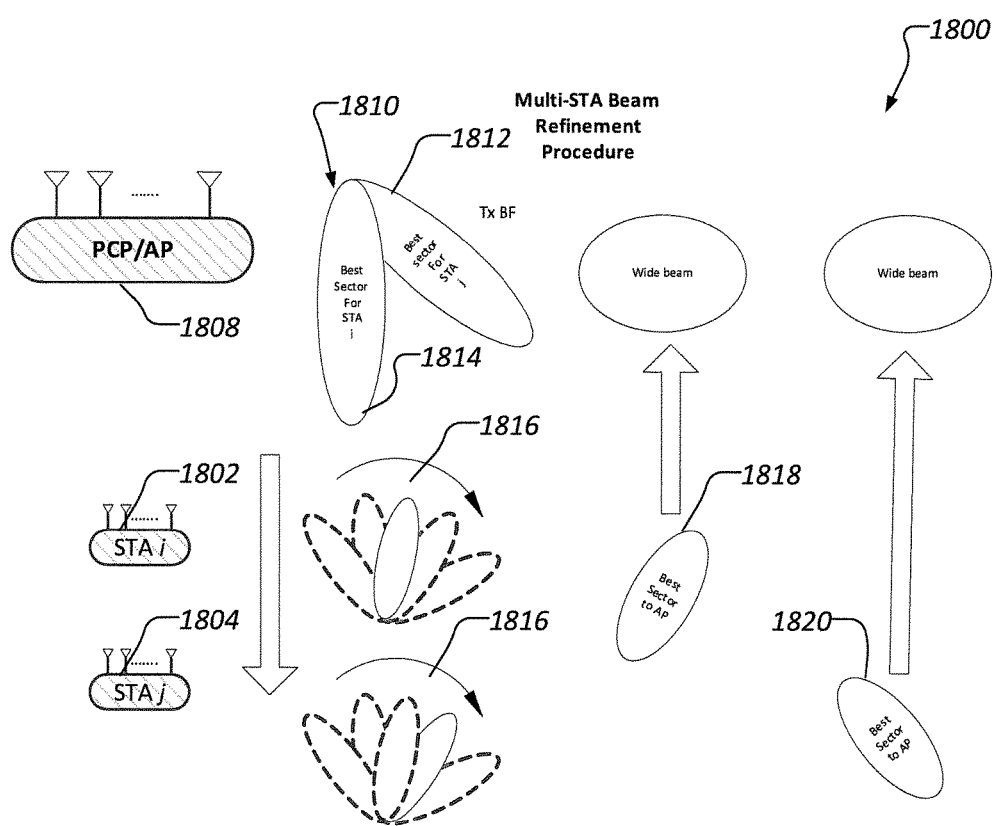
FIG. 18 illustrates an example coarse beam refinement procedure where stations have different best sector IDs according to this disclosure.

FIG. 18 illustrates another example of a Multi-STA BRP operation according to this disclosure. The embodiment of Multi-STA BRP operation shown in FIG. 18 is for illustration only, and other Multi-STA BRP operations in embodiments of the present disclosure could have the same or similar configuration.

FIG. 18 illustrates an example Multi-STA BRP operation 1800 for station receive coarse beam refinement where STAs, such as STA i 1802 and STA j 1804, have different best sector IDs of a PCP/AP 1808. One method to do this would be to cycle through each sector with the process as described above with regard to FIGS. 16 and 17. However, for MU-MIMO/SDMA operation, multiple RF chains are assumed, which enables the PCP/AP 1808 to generate a multi-sector pattern. In such a case, the PCP/AP 1808 can transmit using a multi-sector antenna pattern 1810 The multi-sector pattern 1810 that includes a best sector transmission 1812 for STA i 1802 and a best sector transmission 1812 for STA j 1804. All STAs that have been informed about Rx BRP perform Rx SS 1 during this multi-sector antenna pattern 1810 transmission. This ability to generate a multi-sector antenna pattern 1810 can be set as a requirement for MU-MIMO/SDMA operation by the PCP/AP 1808, and the PCP/AP 1808 announces multiple best sector IDs of requesting Rx BRP to the appropriate STAs. Transmitting the multi-sector antenna pattern 1810 can require additional hardware capability (the ability to generate multiple sector patterns without loss in power in each direction) at the AP 1808. In response, STAs provide feedback, such as feedback 1818 of STA i 1802 and feedback 1820 of STA j 1804, to the PCP/AP 1808 regarding whether the Rx BRP was sufficient and whether further Rx BRP is required. Feedback, such as feedback 1818 and 1820, will be sent in the direction of best Tx sector ID for transmission to the PCP/AP 1808. The SSW can be repeated aSSRep times to improve the Rx BRP. While feedback 1818 and 1820 are shown as being transmitted sequentially, in certain embodiments where the PCP/AP 1808 can ensure collision avoidance, feedback such as feedback 1818 and 1820 can be transmitted in parallel.

Figure 19:
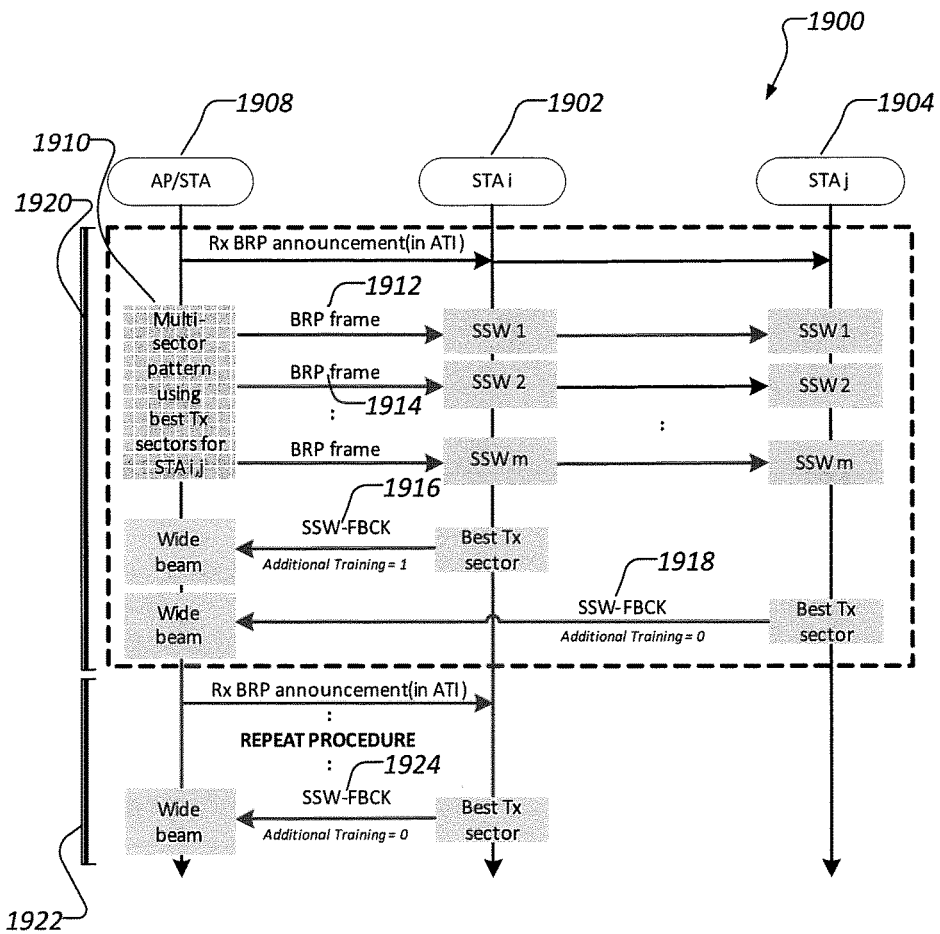
FIG. 19 illustrates an example coarse beam refinement procedure where stations have different best sector IDs and a station indicates a need for additional beam training according to this disclosure.

FIG. 19 illustrates another example of a Multi-STA BRP operation according to this disclosure. The embodiment of Multi-STA BRP operation shown in FIG. 19 is for illustration only, and other Multi-STA BRP operations in embodiments of the present disclosure could have the same or similar configuration.

FIG. 19 illustrates an example Multi-STA BRP operation 1900 for station receive coarse beam refinement where STAs, such as STA i 1902 and STA j 1904, have different best sector IDs of a PCP/AP 1908. In certain embodiments, the PCP/AP 1908 generates a multi-sector pattern 1910 and transmits a first BRP frame 1912 to STA i 1914 along a best sector for STA i 1914. While transmitting the first BRP frame 1912, the PCP/AP 1908 also transmits a second BRP frame 1916 to STA j 1904 along a best sector for STA j 1904. Thereafter, STA i 1902 transmits feedback 1916 to the PCP/AP 1908 indicating that additional training is needed. Following feedback 1916, STA j 1904 transmits feedback 1918 to the PCP/AP 1908 indicating that no additional training is needed. The feedback 1916 and 1918 are each transmitted via a best transmits sectors for STA i 1902 and STA j 1904, respectively. While feedback 1916 and 1918 are shown as being transmitted sequentially, in certain embodiments where the PCP/AP 1808 can ensure collision avoidance, feedback such as feedback 1916 and 1918 can be transmitted in parallel or at least partially simultaneously. In certain embodiments, because STA i 1902 indicated a need for additional training in feedback 1916 during a first iteration 1920 of beam refinement training, a second iteration of beam refinement training 1922 is conducted that ultimately concludes with STA i 1902 sending a feedback 1924 to the AP/STA 1908 indicating that no additional training is needed.

Figure 20:
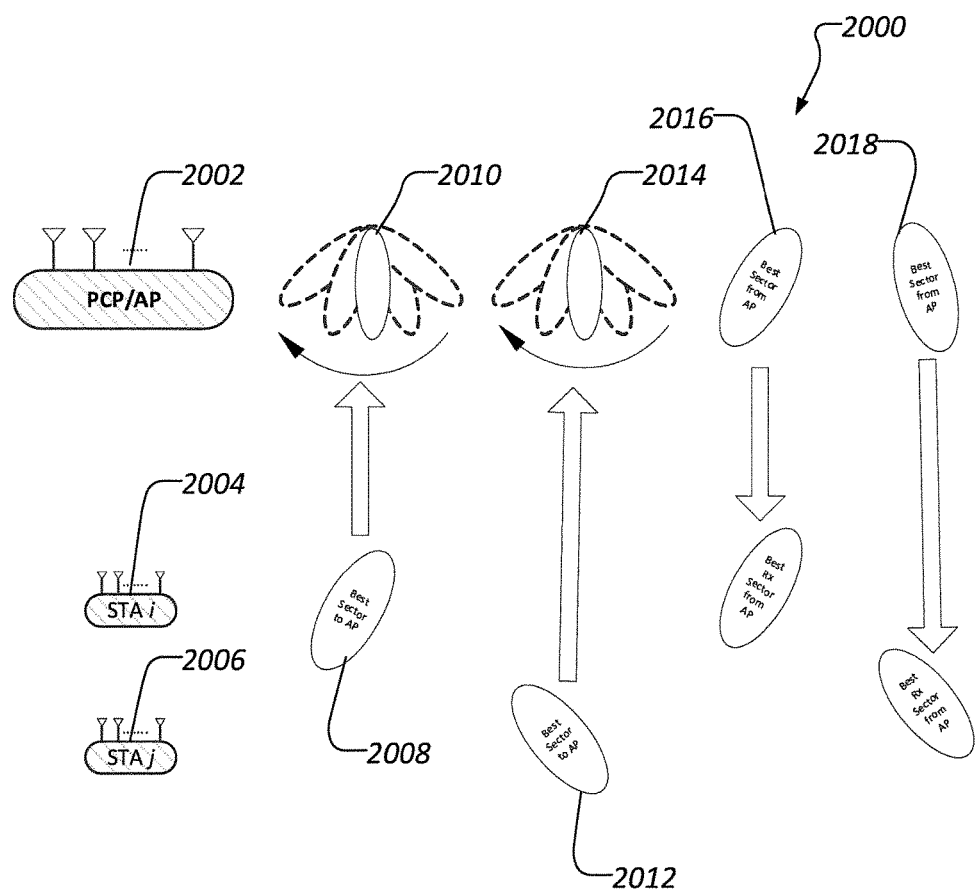
FIG. 20 illustrates an example AP receive beamforming procedure according to this disclosure.

FIG. 20 illustrates another example of a Multi-STA BRP operation according to this disclosure. The embodiment of Multi-STA BRP operation shown in FIG. 20 is for illustration only, and other Multi-STA BRP operations in embodiments of the present disclosure could have the same or similar configuration.

FIG. 20 illustrates an example Multi-STA BRP operation 2000 in which the PCP/AP 2002 performs Rx BRP with multiple STAs, such STA i 2004 and STA j 2006. The PCP/AP 2002 announces to desired required STAs of a need for Rx BRP with the STAs. PCP/AP 2002 performs Rx SSW with single or multiple sector patterns. Multiple sweeps will be required to cover all n STAs determined by aSSRep. Each STA will transmit in their best sector ID sequentially for a time aSSDuration (where aSSDuration=m, aSSRep≥n, if aSSRep>n, repeat cycle) determined by the PCP/AP 2002. In this case, STA i 2004 provides best sector information in a transmission 2008 in response to a first sector sweep 2010. Also in this case, STA j 2006 provides best sector information in a transmission 2012 in response to a second sector sweep 2014. Table 3 shows the time taken for sector sweeps with M RF chains.

TABLE 3

Time taken for sector sweep with M RF chains

|  | aSSDuration | aSSRep | Total time |
|---|---|---|---|
| Sector sweep | m | n/M | m * n/M |
| Partial sweep | k | n/M | k * n/M |

Multiple sector patterns can require hardware capability support and can help reduce sweep time. (aSSDuration=m, aSSRep≥n/M, if aSSRep>n/M, repeat cycle). Partial sweeps are also possible to reduce sweep time if the PCP/AP 2002 has some prior indication of direction from previous sweeps (aSSDuration=k, k<m, aSSRep≥n/M, if aSSRep>n/M, repeat cycle). The PCP/AP 2002 informs STA i 2004 via a feedback 2016 as to whether the Rx BRP was sufficient or whether further Rx BRP is required for STA i 2004. After transmitting feedback 2016, PCP/AP 2002 informs STA j 2006 via a feedback 2018 as to whether the Rx BRP was sufficient or whether further Rx BRP is required for STA j 2006. Feedback 2004 and 2006 are sent in the direction of best Tx sector ID for transmission to STA i 2004 and STA j 2006, respectively. While feedback 2004 and 2006 are sent sequentially or in series, in alternative embodiments, the feedback can be sent in parallel or at least partially simultaneously if PCP/AP 2002 includes mechanisms, such as multiple sector transmission capability, to ensure there are no collisions.

Figure 21:
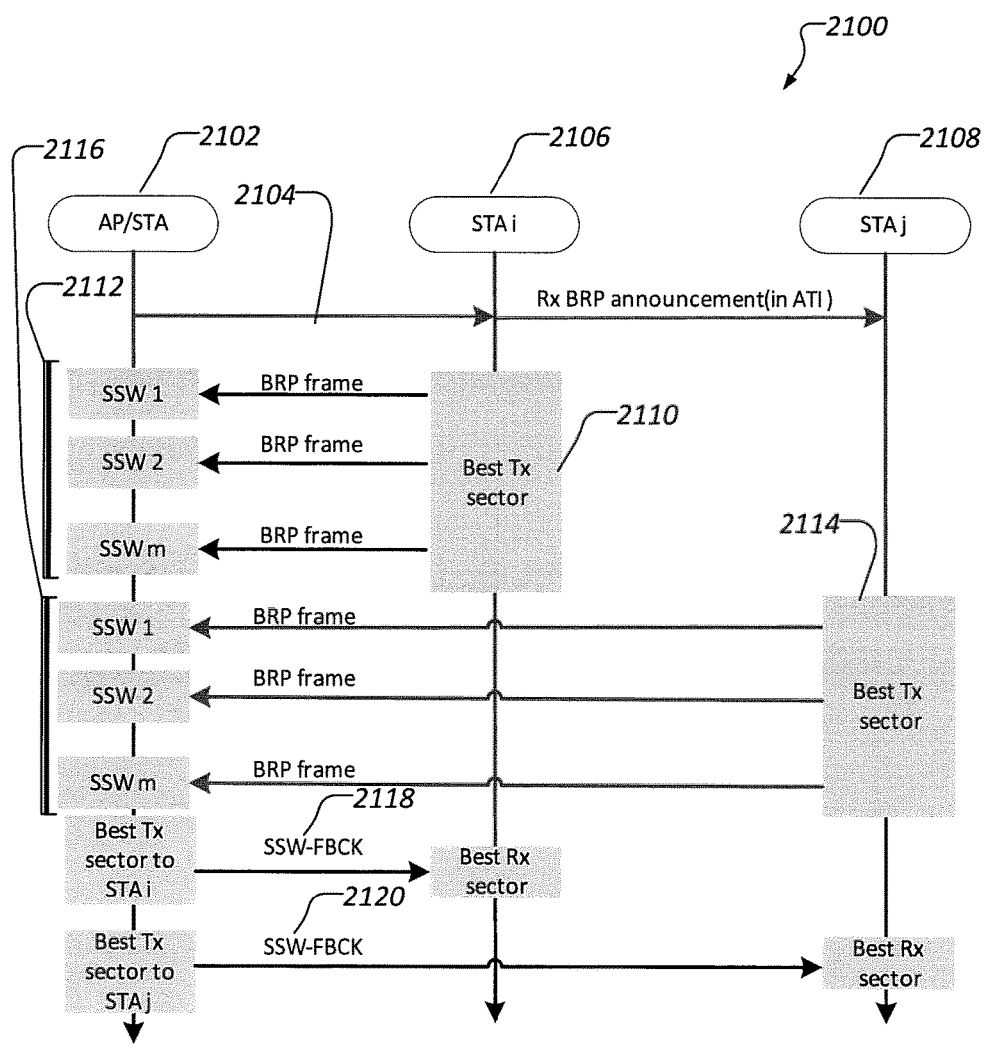
FIG. 21 illustrates an example message sequence chart for the AP receive beamforming procedure of FIG. 20.

FIG. 21 illustrates another example of a Multi-STA BRP operation according to this disclosure. The embodiment of Multi-STA BRP operation shown in FIG. 21 is for illustration only, and other Multi-STA BRP operations in embodiments of the present disclosure could have the same or similar configuration.

FIG. 21 illustrates an example Multi-STA BRP operation 2100 for AP Rx BRP. In certain embodiments, the AP/STA 2102 transmits a BRP announcement 2104 to each of a STA i 2106 and a STA j 2108. In response to the BRP announcement 2104, STA i 2106 transmits best Tx sector information 2110 while the AP/STA 2102 performs SSWs 2112. Also in response to the BRP announcement 2104 and after the STA i 2106 transmits best Tx sector information 2110, the STA j 2108 transmits best Tx sector information 2114 while the AP/STA 2102 performs SSWs 2116. Next, AP/STA 2102 transmits best Tx sector feedback 2118 to STA i 2106 via the best transmit sector to STA i 2106. Next, AP/STA 2102 transmits best Tx sector feedback 2120 to STA i 2108 via the best transmit sector to STA i 2108. While feedback 2118 and 2120 are shown as being transmitted sequentially, in certain embodiments where the AP/STA 2102 can ensure collision avoidance, feedback such as feedback 2118 and 2120 can be transmitted in parallel or at least partially simultaneously.

Fine beam refinement (FBR) assumes that coarse beam refinement has been performed. FBR follows substantially similar procedures as the above-described coarse beam refinement BRPs with the exceptions that wide beams are replaced by best Tx and Rx sector beams obtained during coarse beam refinement and sector beams are replaced by narrow beams. In certain embodiments, wide beams are broader than fine beams and fine beams are broader than narrow beams. At the end of a fine beam refinement phase, the best narrow beam IDs are known for Tx and Rx.

In certain embodiments, Multi-STA joint Tx-Rx beam tracking is used when multi-sector patterns are used for the purpose of future MU-MIMO/SDMA operation and STAs are in different sectors for AP Tx-Rx. Beam tracking is used in MU-MIMO when mobility or interference cause the currently selected beams to no longer be optimum, thereby requiring an adaptation of the beam patterns. In certain cases, a first order estimate of both Tx and Rx best beams (SECTOR/NARROW) from the AP and STA can be assumed to be available. There are two cases for discussion, namely, a case of joint AP Tx & STA Rx tracking and a case of joint AP Rx & STA Tx tracking.

Figure 22:
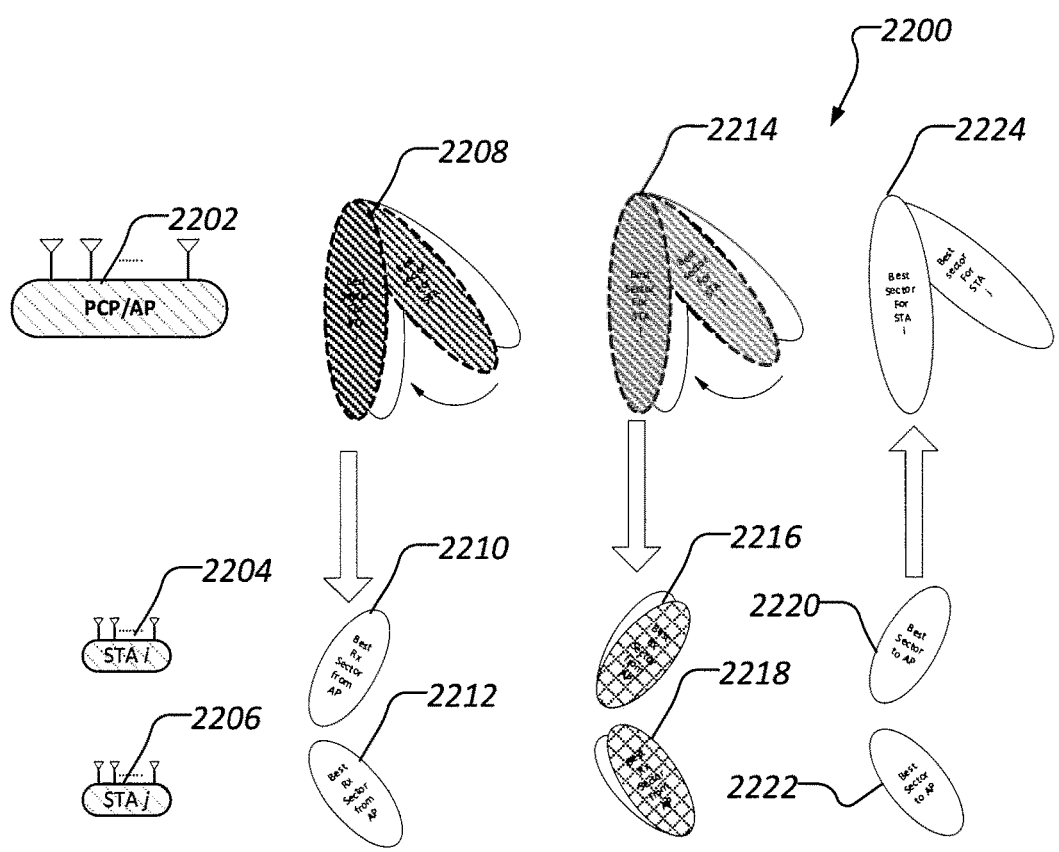
FIG. 22 illustrates an example Multi-STA beam tracking protocol operation for a transmitting PCP/AP and receiving STAs according to this disclosure.

FIG. 22 illustrates another example of a Multi-STA BRP operation according to this disclosure. The embodiment of Multi-STA BRP operation shown in FIG. 22 is for illustration only, and other Multi-STA BRP operations in embodiments of the present disclosure could have the same or similar configuration.

FIG. 22 illustrates an example Multi-STA beams tracking protocol operation 2200 for beam tracking beam tracking for transmitting PCP/AP 2202 and receiving STAs, STA i 2204 and STA j 2206. In certain embodiments, the multi-STA beam tracking protocol utilizes a message sequence chart for the case while the PCP/AP 2202 is transmitting and the Rx beams of STA i 2204 and STA j 2206 are being tracked. The PCP/AP 2202 sweeps current multi-sector pattern 2208 in aSSDuration while STA i 2204 and STA j 2206 maintain best Rx patterns 2210 and 2212, respectively. Next, the PCP/AP 2202 sweeps repeat aSSRep times, such as sweep 2214, while STA i 2204 and STA j 2206 try other Rx patterns 2216 and 2218, respectively. Next, STA i 2204 and STA j 2206 transmit best sector choices 2220 and 2222, respectively, back to the PCP/AP 2202 that receives the best sector choices 2220, 2222 via the previously determined best sectors 2224 for each of STA i 2204 and STA j 2206. After receiving the best sector choices 2220, 2222, the PCP/AP 2202 looks at all the reports and makes a decision on the beam pattern and whether to continue supporting MU-MIMO operation. The PCP/AP 2208 can also request further beam tracking. (aSSRep≥k. if >k, repeat cycle).

Figure 23:
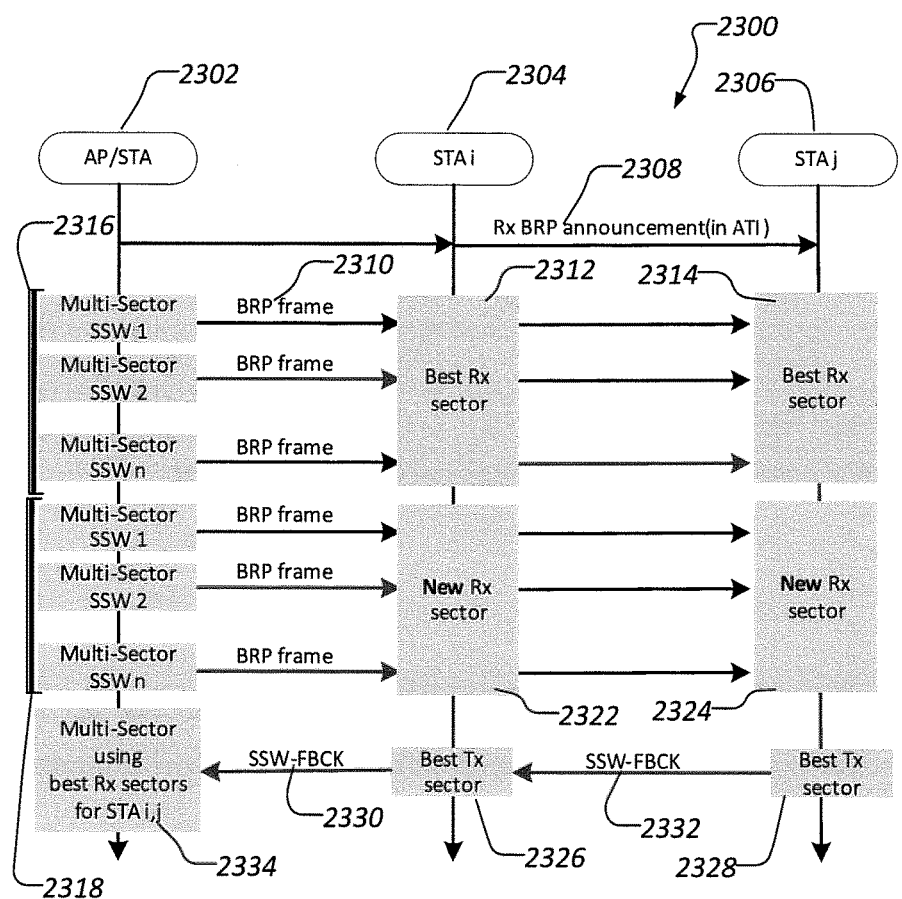
FIG. 23 illustrates an example message sequence chart for the beamforming procedure of FIG. 22.

FIG. 23 illustrates another example of a Multi-STA BRP operation according to this disclosure. The embodiment of Multi-STA BRP operation shown in FIG. 23 is for illustration only, and other Multi-STA BRP operations in embodiments of the present disclosure could have the same or similar configuration.

FIG. 23 illustrates an example Multi-STA beams tracking protocol operation 2300 for beam tracking beam tracking for transmitting AP/STA 2302 and receiving STAs, STA i 2304 and STA j 2306. The AP/STA 2302 sends a Rx BRP announcement 2308 to STA i 2304 and STA j 2306. After the announcement 2308, the multi-STA beam tracking protocol utilizes a message sequence chart while the PCP/AP 2302 is transmitting BRP frames 2310 and the Rx beams of STA i 2304 and STA j 2306 are being tracked to determine best Rx sector information 2312 and 2314, respectively. In a first iteration 2316, the PCP/AP 2302 sweeps current multi-sector pattern in aSSDuration while STA i 2304 and STA j 2306 maintain best Rx patterns. During a second iteration 2318, the PCP/AP 2302 sweep repeats while STA i 2304 and STA j 2306 try other Rx patterns. During the second iteration 2318, the PCP/AP 2302 transmits BRP frames 2320 and STA i 2304 and STA j 2306 determine new best Rx sectors 2322 and 2324, respectively. Next, the STA i 2304 and STA j 2306 transmit best Tx sector information 2326 and 2328, respectively, back to the PCP/AP 2302 using feedback 2330 and 2332, respectively. The AP/STA 2302 receives the feedback 2330 and 2332 using multiple best Rx sectors 2334. After receiving the best sectors 2326, 2328, the PCP/AP 2302 looks at all the reports and makes a decision on the beam pattern and whether to continue supporting MU-MIMO operation. The PCP/AP 2308 can also request further beam tracking. (aSSRep≥k. if >k, repeat cycle).

Figure 24:
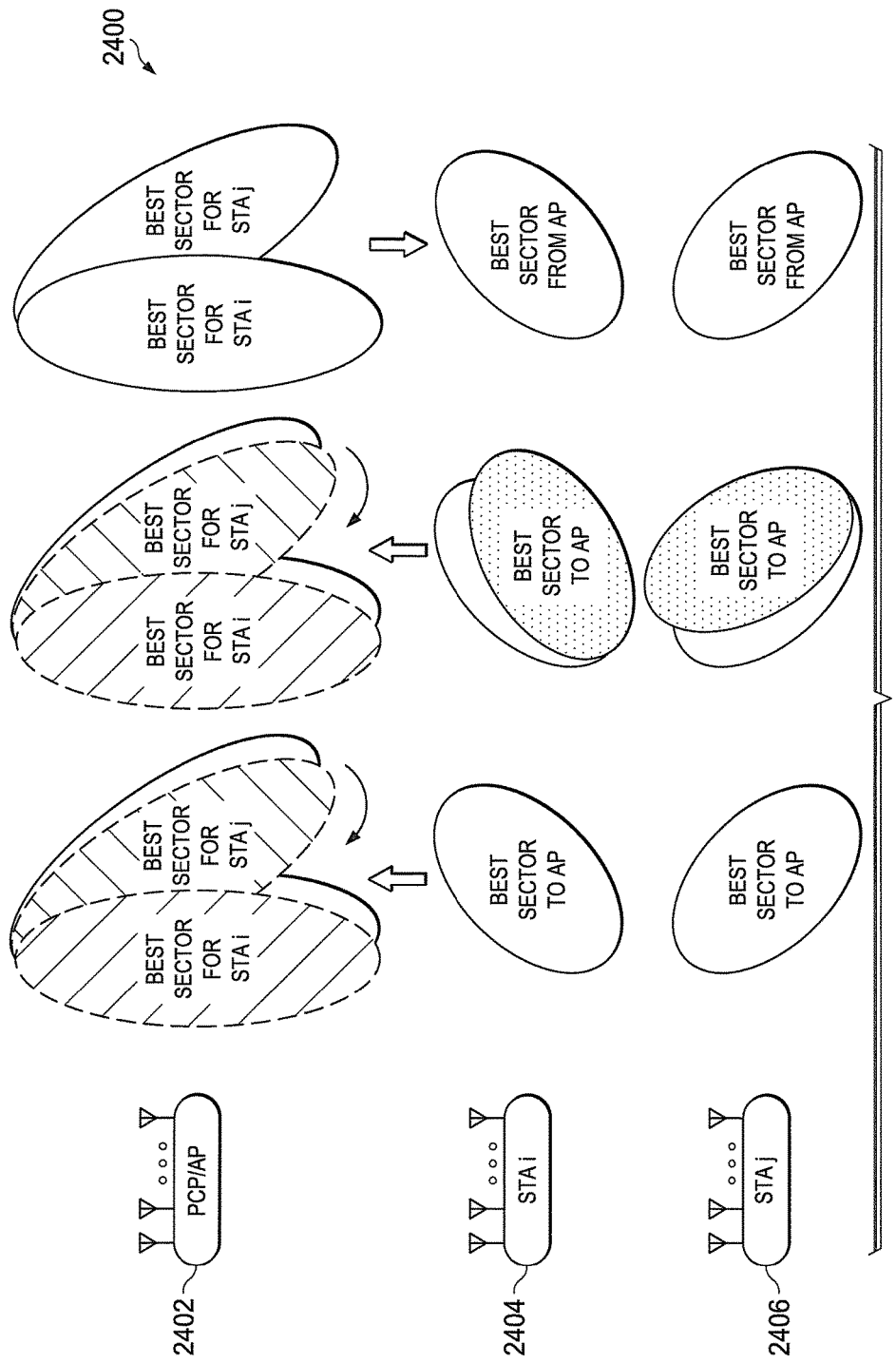
FIG. 24 illustrates an example Multi-STA beam tracking protocol operation for a receiving PCP/AP and transmitting STAs according to this disclosure.

FIG. 24 illustrates another example of a Multi-STA BRP operation according to this disclosure. The embodiment of Multi-STA BRP operation shown in FIG. 24 is for illustration only, and other Multi-STA BRP operations in embodiments of the present disclosure could have the same or similar configuration.

FIG. 24 illustrates an example Multi-STA beam tracking protocol operation 2400 for beam tracking beam tracking for receiving PCP/AP 2402 and transmitting STAs, STA i 2404 and STA j 2406. This embodiment is substantially similar to the embodiment of FIG. 22 but with the roles of the STAs and the PCP/AP reversed.

Figure 25:
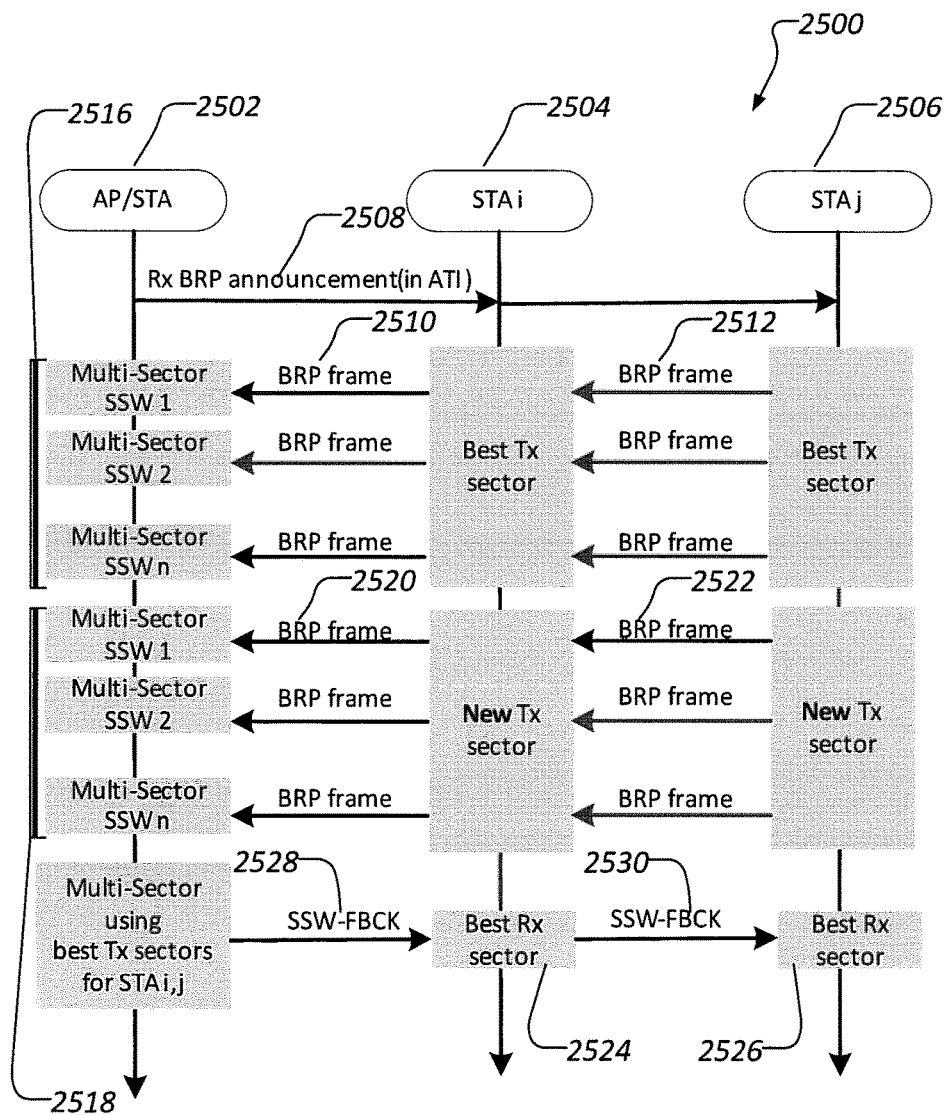
FIG. 25 illustrates an example message sequence chart for the beamforming procedure of FIG. 24.

FIG. 25 illustrates another example of a Multi-STA BRP operation according to this disclosure. The embodiment of Multi-STA BRP operation shown in FIG. 25 is for illustration only, and other Multi-STA BRP operations in embodiments of the present disclosure could have the same or similar configuration.

FIG. 25 illustrates an example Multi-STA beams tracking protocol operation 2500 for beam tracking beam tracking receiving AP/STA 2502 and transmitting STAs, STA i 2504 and STA j 2506. The AP/STA 2502 sends a Rx BRP announcement 2508 to STA i 2504 and STA j 2506. After the announcement 2508, the multi-STA beam tracking protocol utilizes a message sequence chart while the STA i 2504 and STA j 2506 transmit BRP frames 2510 and 2512, respectively. In a first iteration 2516, the PCP/AP 2502 sweeps current multi-sector pattern in aSSDuration while STA i 2504 and STA j 2506 maintain best Tx patterns. During a second iteration 2518, the PCP/AP 2502 sweep repeats while STA i 2504 and STA j 2506 try other Tx patterns. During the second iteration 2518, the STA i 2504 and STA j 2506 transmit BRP frames 2520 and 2522, respectively, and AP/STA 2502 determines new best Tx sectors. Next, the PCP/AP 2502 transmit best Rx sector information 2524 and 2526, respectively, back to the STA i 2504 and STA j 2506 using feedback 2528 and 2530, respectively. The AP/STA 2502 transmits the feedback 2528 and 2530 using multiple best Tx sectors.

Figure 26:
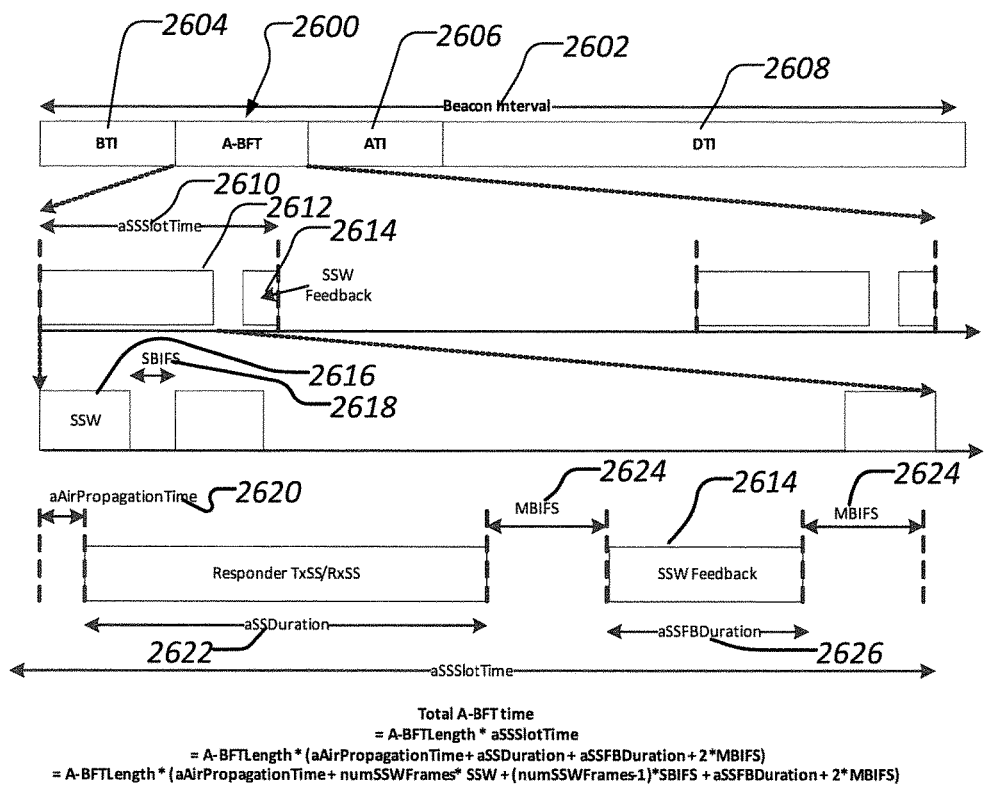
FIG. 26 illustrates an example A-BFT structure in IEEE 802.11 ad according to this disclosure.

FIG. 26 illustrates an example of an IEEE 802.11 ad initial beam forming training (A-BFT) structure for association according to this disclosure. The embodiment of A-BFT structure shown in FIG. 26 is for illustration only, and other A-BFT structures in embodiments of the present disclosure could have the same or similar configuration.

FIG. 26 illustrates an IEEE 802.11ad initial beam forming training (A-BFT) structure 2600 for association. The A-BFT structure 2600 occupies a portion of a beacon interval 2602 and follows a beacon transmission interval (BTI) 2604 of the beacon interval 2602. The A-BFT structure 2600 precedes an announcement transmission interval (ATI) 2606 of the beacon interval 2602. A data transmission interval (DTI) 2608 follows the ATI 2606. The A-BFT structure 2600 includes an aSSSlotTime 2610 that includes a first portion 2612 and a subsequent SSW feedback 2614. The first portion 2612 includes a SSW 2616 followed by short beam forming interframe spacing (SBIFS) 2618. The aSSSlotTime 2610 can also be explained as including aAirPropogationTime 2620, followed by an aSSDuration 2622 (including responder TxSS and RxSS), followed by a medium beamforming interframe spacing (MBIFS) 2624, followed by an aSSFBDuration 2626 (including SSW Feedback 2614), followed by another MBIFS 2624.

Figure 27:
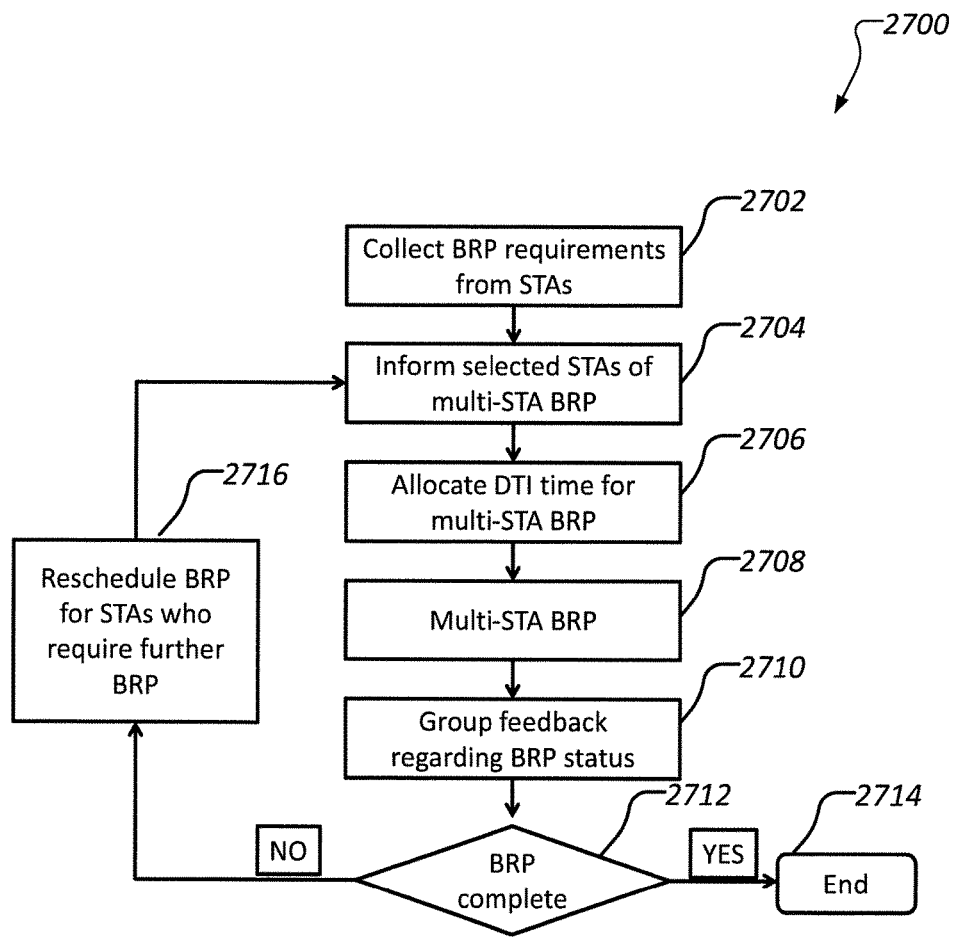
FIG. 27 illustrates a Multi-STA BRP method according to this disclosure.

FIG. 27 illustrates a flowchart of a Multi-STA BRP method 2700 according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, an AP or a STA.

In certain embodiments, the Multi-STA BRP method 2700 begins at step 2702 by the AP collecting BRP requirements from stations. At step 2704, the AP informs selected stations of Multi-STA BRP, such as by sending an announcement. Next at step 2706, the AP allocates DTI time for Multi-STA BRP. At step 2708, the AP performs the above-described multiple station BRP. Next at step 2710, the AP provides group feedback regarding BRP status. At step 2712, the AP determines whether BRP is complete. If BRP is complete, the method progresses to step 2714 and the method 2700 ends. If the BRP is determined at step 2712 to not be complete, the method progresses to step 2716 and the AP reschedules BRP for stations that require further BRP. From step 2716, the method progresses back to step 2704.

FIG. 28 illustrates a matrix 2800 of possible Multi-STA BRP cases and provides reference between the cases and the related figures of this disclosure. The embodiment of the matrix 2800 is for illustration only. Other embodiments could be used without departing from the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing multiple station beam refinement in a millimeter wave (mmWave) wireless network comprising an access point (AP) and a plurality of stations (STAs), the method comprising:
   selectively transmitting, by the AP, wireless signals to a plurality of directional sectors;
   selectively receiving, by the AP, wireless signals from the plurality of directional sectors;
   grouping at least two of the plurality of STAs together for transmission as a function of a capability of the plurality of STAs to provide Multi-STA support for the beam refinement and sector identifier (ID) of the plurality of STAs determined based on the received wireless signals from the plurality of directional sectors; and
   performing AP transmit beam refinement for a multi-STA transmission to the grouped STAs based on the received wireless signals from the plurality of directional sectors.

2. The method of claim 1, wherein the beam refinement comprises at least one of refining a wide beam into a sector beam, refining a sector beam into a narrow beam, and evaluating a current beam and choosing an alternative beam having a same beamwidth in the same sector as the current beam or in a sector different from the sector of the current beam.

3. The method of claim 1, wherein the plurality of STAs are located in a same sector of the AP.

4. The method of claim 1, wherein the plurality of STAs are located in different sectors of the AP.

5. The method of claim 1, further comprising at least one of providing simultaneous transmit beam refinement for the plurality of STAs and providing simultaneous receive beam refinement for the plurality of STAs simultaneously with at least one of receiving simultaneous transmit beam refinement from the plurality of STAs and receiving simultaneous receive beam refinement from the plurality of STAs.

6. The method of claim 1, wherein AP transmit beams are refined in the AP transmit beam refinement by receiving multiple transmissions from the plurality of STAs simultaneously.

7. An access point (AP) for a millimeter wave (mmWave) wireless network comprising the access point (AP) and a plurality of stations (STAs), the AP comprising:
 a number of radio frequency (RF) transceivers configured to, via a number of antennas, transmit signals to a plurality of directional sectors to the plurality of STAs and receive signals from the plurality of directional sectors from the plurality of STA; and
 processing circuitry configured to:
  generate a multiple station beamforming refinement protocol (Multi-STA BRP) frame configured to cause the number of RF transceivers to trigger simultaneous beam refinement between the AP and the plurality of STAs, wherein while the AP is transmitting beam refinement frames in a sector during a first time period, at least two STAs in the sector utilize the beam refinement frames during the first time period to refine their beams; and
  group at least two of the plurality of STAs together for transmission as a function of a capability of the plurality of STAs to provide Multi-STA support for the beam refinement and sector identifier (ID) of the plurality of STAs determined based on the received signals from the plurality of directional sectors.

8. The AP of claim 7, wherein the Multi-STA BRP frame comprises: information about a duration of a sector sweep; and at least one of sweep feedback information for at least two of the plurality of STAs and sweep feedback information from at least two of the plurality of STAs.

9. The AP of claim 7, wherein the Multi-STA BRP frame comprises information about a list of STAs of the plurality of STAs involved in the multiple station beam refinement.

10. The AP of claim 7, wherein the Multi-STA BRP frame comprises information about sector sweep repetitions.

11. The AP of claim 7, wherein the Multi-STA BRP frame comprises information about at least one of a type of beam refinement and a direction of beam refinement.

12. The AP of claim 7, wherein the Multi-STA BRP frame comprises information about at least one of a best sector and a narrow beam.

13. The AP of claim 7, wherein the AP is configured to perform a receiver coarse beam refinement prior to initiating a fine beam refinement.

14. The AP of claim 7, wherein the AP is configured to at least one of sequentially receive feedback regarding the beam refinement of at least two of the plurality of STAs and receive feedback regarding the beam refinement of at least two of the plurality of STAs in parallel.

15. The AP of claim 7, wherein the AP is configured to use at least one of a signal to noise ratio, a direction, and a STA capability to group the plurality of STAs for beam refinement.

16. An access point (AP) for a millimeter wave (mmWave) wireless network comprising the access point (AP) and a plurality of stations (STAs), the AP comprising:
 a number of radio frequency (RF) transceivers configured to, via a number of antennas, transmit signals to a plurality of directional sectors to the plurality of STAs and receive signals from the plurality of directional sectors from the plurality of STAs; and
 processing circuitry configured to cause the RF transceivers to:
  group at least two of the plurality of STAs together for transmission as a function of a capability of plurality of STAs to provide Multi-STA support for beam refinement and sector identifier (ID) of the plurality of STAs determined based on the received signals from the plurality of directional sectors; and
  perform AP transmit beam refinement for a multi-STA transmission to the grouped STAs based on the received signals from the plurality of directional sectors.

17. The AP of claim 16, wherein the processing circuitry is configured to support at least two levels of beamwidth refinement.

18. The AP of claim 16, wherein the processing circuitry is configured to at least one of: transmit independent beam refinement information in at least two beam directions simultaneously; and receive independent beam refinement information from at least two directions simultaneously.

19. The AP of claim 16, wherein the processing circuitry is configured to at least one of: transmit sector sweep feedback in at least two beam directions simultaneously; and receive sector sweep feedback from at least two beam directions simultaneously.

20. The AP of claim 16, wherein the processing circuitry is configured to generate a multiple beam pattern and to use the multiple beam pattern to at least one of: transmit same beam refinement frames to at least two stations simultaneously; and receive same beam refinement frames from at least two stations simultaneously.

* * * * *